United States Patent
Tsatsin et al.

(10) Patent No.: US 10,909,459 B2
(45) Date of Patent: Feb. 2, 2021

(54) CONTENT EMBEDDING USING DEEP METRIC LEARNING ALGORITHMS

(71) Applicant: Cognizant Technology Solutions U.S. Corporation, College Station, TX (US)

(72) Inventors: Petr Tsatsin, San Francisco, CA (US); Philip M. Long, Palo Alto, CA (US); Diego Guy M. Legrand, San Francisco, CA (US); Nigel Duffy, San Francisco, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 854 days.

(21) Appl. No.: 15/619,299

(22) Filed: Jun. 9, 2017

(65) Prior Publication Data

US 2017/0357896 A1    Dec. 14, 2017

Related U.S. Application Data

(60) Provisional application No. 62/348,097, filed on Jun. 9, 2016.

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01)

(58) Field of Classification Search
CPC .............................. G06N 3/084; G06N 3/0454
See application file for complete search history.

(56) References Cited

U.S. PATENT DOCUMENTS 5,696,964 A    12/1997   Cox et al.
5,930,784 A    7/1999   Hendrickson
(Continued)

OTHER PUBLICATIONS

Sorokin et al., "Utility Data Annotation with Amazon Mechanical Turk," IEEE (2008) (Year: 2008).*

(Continued)

*Primary Examiner* — Kakali Chaki
*Assistant Examiner* — Kevin L. Smith
(74) *Attorney, Agent, or Firm* — Dawn-Marie Bey; Bey & Cotropia PLLC

(57) ABSTRACT

The technology disclosed introduces a concept of training a neural network to create an embedding space. The neural network is trained by providing a set of K+2 training documents, each training document being represented by a training vector x, the set including a target document represented by a vector $x^t$, a favored document represented by a vector $x^s$, and K>1 unfavored documents represented by vectors $x_i^u$, each of the vectors including input vector elements, passing the vector representing each document set through the neural network to derive an output vectors $y^t$, $y^s$ and $y_i^u$, each output vector including output vector elements, the neural network including adjustable parameters which dictate an amount of influence imposed on each input vector element to derive each output vector element, adjusting the parameters of the neural network to reduce a loss, which is an average over all of the output vectors $y_i^u$ of $[D(y^t,y^s)-D(y^t, y_i^u)]$.

16 Claims, 19 Drawing Sheets

(56) References Cited

U.S. PATENT DOCUMENTS

| | | |
|---|---|---|
| 6,098,034 A | 8/2000 | Razin et al. |
| 6,286,018 B1 | 9/2001 | Pitkow et al. |
| 6,347,313 B1 | 2/2002 | Ma et al. |
| 6,353,825 B1 | 3/2002 | Ponte |
| 6,574,616 B1 | 6/2003 | Saghir |
| 7,099,860 B1 | 8/2006 | Liu et al. |
| 7,152,031 B1 | 12/2006 | Jensen et al. |
| 7,200,243 B2 | 4/2007 | Keenan et al. |
| 7,480,640 B1 | 1/2009 | Elad et al. |
| 7,567,960 B2 | 7/2009 | Wei et al. |
| 7,813,581 B1 | 10/2010 | Fitzpatrick et al. |
| 7,814,107 B1 | 10/2010 | Thirumalai et al. |
| 8,027,541 B2 | 9/2011 | Hua et al. |
| 8,150,822 B2 | 4/2012 | Bluvband et al. |
| 8,160,939 B2 | 4/2012 | Schrenk |
| 8,170,966 B1 | 5/2012 | Musat et al. |
| 8,254,697 B2 | 8/2012 | Isard et al. |
| 8,676,802 B2 | 3/2014 | Zelevinsky et al. |
| 8,832,134 B2 | 9/2014 | Gronow et al. |
| 8,843,478 B1 | 9/2014 | Jing et al. |
| 8,958,662 B1 | 2/2015 | Grosz et al. |
| 8,972,394 B1 | 3/2015 | Tong et al. |
| 9,116,976 B1 | 8/2015 | Bem et al. |
| 10,102,277 B2 | 10/2018 | Legrand et al. |
| 10,360,732 B2 | 7/2019 | Krishnaswamy et al. |
| 10,521,691 B2 | 12/2019 | Najibikohnehshahri et al. |
| 10,528,819 B1 | 1/2020 | Manmatha et al. |
| 10,572,723 B2 | 2/2020 | Jiang et al. |
| 2002/0091678 A1 | 7/2002 | Miller et al. |
| 2002/0138478 A1 | 9/2002 | Schwartz et al. |
| 2002/0164078 A1 | 11/2002 | Uehara et al. |
| 2004/0107194 A1 | 6/2004 | Thorpe |
| 2005/0165600 A1 | 7/2005 | Kasravi et al. |
| 2006/0212415 A1 | 9/2006 | Backer et al. |
| 2007/0011154 A1 | 1/2007 | Musgrove et al. |
| 2007/0088534 A1 | 4/2007 | MacArthur et al. |
| 2007/0174244 A1 | 7/2007 | Jones |
| 2007/0288432 A1 | 12/2007 | Weltman et al. |
| 2008/0126464 A1 | 5/2008 | Mowzoon |
| 2008/0243842 A1 | 10/2008 | Liang et al. |
| 2008/0285861 A1 | 11/2008 | Mitarai et al. |
| 2008/0306943 A1 | 12/2008 | Patterson |
| 2009/0016610 A1 | 1/2009 | Ma et al. |
| 2009/0132347 A1 | 5/2009 | Anderson et al. |
| 2010/0104191 A1 | 4/2010 | McGwire |
| 2010/0134415 A1 | 6/2010 | Iwase et al. |
| 2010/0223258 A1 | 9/2010 | Ghahramani et al. |
| 2010/0293117 A1 | 11/2010 | Xu |
| 2011/0029561 A1 | 2/2011 | Slaney et al. |
| 2011/0064316 A1 | 3/2011 | Hamamura et al. |
| 2011/0173037 A1 | 7/2011 | Attenberg et al. |
| 2011/0246409 A1 | 10/2011 | Mitra |
| 2013/0191381 A1 | 7/2013 | Jin et al. |
| 2013/0212090 A1 | 8/2013 | Sperling et al. |
| 2013/0226922 A1 | 8/2013 | Labenski et al. |
| 2013/0246439 A1 | 9/2013 | Liekens et al. |
| 2013/0336588 A1 | 12/2013 | Rane et al. |
| 2014/0019431 A1 | 1/2014 | Suleyman et al. |
| 2014/0019484 A1 | 1/2014 | Coppin et al. |
| 2014/0222789 A1 | 8/2014 | Gras |
| 2014/0258195 A1 | 9/2014 | Weng et al. |
| 2015/0036948 A1 | 2/2015 | Wenzel et al. |
| 2015/0088871 A1 | 3/2015 | Ruotsalo et al. |
| 2015/0170004 A1* | 6/2015 | Song ................ G06K 9/623 382/218 |
| 2015/0220833 A1* | 8/2015 | Le .................... G06N 3/084 706/16 |
| 2015/0235160 A1 | 8/2015 | Larlus-Larrondo et al. |
| 2015/0286957 A1 | 10/2015 | Knight |
| 2015/0317344 A1 | 11/2015 | Birdwell et al. |
| 2015/0363001 A1 | 12/2015 | Malzbender |
| 2016/0078359 A1 | 3/2016 | Csurka et al. |
| 2016/0086052 A1 | 3/2016 | Piekniewski et al. |
| 2016/0155067 A1 | 6/2016 | Dubnov et al. |
| 2016/0180151 A1* | 6/2016 | Philbin ............ G06K 9/00288 382/118 |
| 2016/0196665 A1 | 7/2016 | Abreu et al. |
| 2016/0328856 A1 | 11/2016 | Mannino et al. |
| 2016/0350336 A1 | 12/2016 | Checka et al. |
| 2016/0379371 A1 | 12/2016 | Chen et al. |
| 2017/0031904 A1 | 2/2017 | Legrand et al. |
| 2017/0039198 A1 | 2/2017 | Ramamurthy et al. |
| 2017/0091319 A1 | 3/2017 | Legrand et al. |
| 2017/0255832 A1* | 9/2017 | Jones ................ G06N 3/0454 |
| 2017/0262735 A1 | 9/2017 | Ros Sanchez et al. |
| 2017/0357896 A1 | 12/2017 | Tsatsin et al. |
| 2018/0082428 A1 | 3/2018 | Leung et al. |
| 2018/0165548 A1 | 6/2018 | Wang et al. |
| 2018/0204076 A1 | 7/2018 | Tripathi et al. |
| 2019/0019012 A1 | 1/2019 | Huang et al. |
| 2019/0073564 A1 | 3/2019 | Saliou |
| 2019/0122404 A1 | 4/2019 | Freeman et al. |
| 2019/0130189 A1 | 5/2019 | Zhou et al. |
| 2019/0130208 A1 | 5/2019 | Michael et al. |
| 2019/0180090 A1 | 6/2019 | Jiang et al. |
| 2019/0205649 A1 | 7/2019 | Ananthanarayanan et al. |
| 2019/0228266 A1 | 7/2019 | Habibian et al. |
| 2019/0244107 A1 | 8/2019 | Murez et al. |
| 2019/0244366 A1 | 8/2019 | Yu et al. |
| 2019/0311202 A1 | 10/2019 | Lee et al. |
| 2019/0325275 A1 | 10/2019 | Lee et al. |
| 2020/0026954 A1 | 1/2020 | Rhodes et al. |
| 2020/0045289 A1 | 2/2020 | Raziel et al. |
| 2020/0055515 A1 | 2/2020 | Herman et al. |

OTHER PUBLICATIONS

Yanagimoto et al., "Document Similarity Estimation for Sentiment Analysis using Neural Network," IEEE (2013) (Year: 2013).*

Kingma et al., "Auto-Encoding Variational Bayes," (2014) (Year: 2014).*

Wang et al., "Unsupervised Learning of Visual Representations using Videos," ICCV (2015) (Year: 2015).*

Schroff et al., "FaceNet: A Unified Embedding for Face Recognition and Clustering," CVPR (2015) (Year: 2015).*

PCT/IB2017/53442—International Search Report dated Nov. 13, 2017, 11 pages.

Ke, Yan, et al., "Efficient Near-duplicate Detection and Sub-image Retrieval", MM'04, Oct. 10-16, 2004, New York, 3 pages.

Kennedy, Lyndon, et al., "Generating Diverse and Representative Image Search Results for Landmarks", WWW 2008/Refereed Track: Rich Media, Apr. 21-25, 2008, Beijing, China, p. 297-306.

"Markov chain Monte Carlo", Wikipedia, https://en.wikipedia.org/wiki/Markov_chain_Monte_Carlo, accessed Mar. 7, 2016, 6 pages.

Studer, "WeightedCluster Library Manual: A practical guide to creating typologies of trajectories in the social sciences with R," LIVES Working Papers, 24 pages (2013).

Agrawal et al., "Analysis of Thompson Sampling for the multi-armed bandit," J MLR: Workshop and Conference Proceedings vol. 23 (2012). 26 pages.

Herbster et al, "Tracking the Best Linear Predictor, Journal of Machine Learning Reseaarch," Sep. 2001, 29 pages.

Herbster et al, Tracking the Best Expert, Machine Learning, 32, 1998, 28 pages.

PCT/IB16/057510—International Search Report and Written Opinion dated Apr. 12, 2017, 22 pages.

GB 1621341.5—Voluntary Amendment dated Feb. 23, 2017, 47 pages.

PCT/IB2016/001590—International Search Report and Written Opinion dated May 11, 2017, 11 pages.

Stasko, et al., "Jigsaw: Supporting Investigative Analysis Through Interactive Visualization." Information Visualization 7.2 (2008): 118-132.

Fang, et al., "Experiments in mental face retrieval." Audio-and Video-Based Biometric Person Authentication. Springer Berlin Heidelberg, 2005, 10 pages.

Vinay, et al. "Evaluating relevance feedback and display strategies for searching on small displays." String Processing and Information Retrieval. Springer Berlin Heidelberg, 2004, 2 pages.

(56) References Cited

OTHER PUBLICATIONS

Cox, et al. "The Bayesian Image Retrieval System, PicHunter: Theory, Implementation, and Psychophysical Experiments." Image Processing, IEEE Transactions on 9.1 (2000): pp. 20-37.
Cox, et al. "An Optimized Interaction Strategy for Bayesian Relevance Feedback." Computer Vision and Pattern Recognition, 1998. Proceedings. 1998 IEEE Computer Society Conference on. IEEE, 1998, 6 pages.
Collins, et al., "New Ranking Algorithms for Parsing and Tagging: Kernels Over Discrete Structures, and the Voted Perceptron," ACL '02 Proceedings of the 40th Annual Meeting on Association for Computational Linguistics, 2002, 9 pages.
Freund, et al., "An Efficient Boosting Algorithm for Combining Preferences," Journal of Machine Learning Research 4 (2003) 37 pages.
Burnetas and Katehakis, "Optimal adaptive policies for Markov decision processes." Mathematics of Operations Research 22.1 (1997): 222-255.
Chu, et al., "Contextual bandits with linear payoff functions," In International Conference on Artificial Intelligence and Statistics, pp. 208-214 (2011).
Sadeghian et al., "Tracking the untrackable: Learning to track multiple cues with long-term dependencies," arXiv preprint arXiv:1701.01909 4, No. 5, 2017, 12 pages.
Milan et al., "MOT16: A benchmark for multi-object tracking," arXiv preprint arXiv:1603.00831, 2016, 12 pages.
Luo et al., Multiple object tracking: A literature review, arXiv preprint arXiv:1409.7618, 2014, 18 pages.
Bertinetto et al., "Fully-convolutional siamese networks for object tracking," In European conference on computer vision, pp. 850-865. Springer, Cham, 2016.
Liu et al., "SSD: Single shot multibox detector," In European conference on computer vision, pp. 21-37. Springer, Cham, 2016.
U.S. Appl. No. 14/494,364—Office Action dated Jun. 2, 2017, 61 pages.
U.S. Appl. No. 14/494,364—Response to Office Action dated Jun. 2, 2017, filed Nov. 2, 2017, 25 pages.
U.S. Appl. No. 14/494,364—Final Office Action dated Feb. 5, 2018, 38 pages.
U.S. Appl. No. 15/373,897—Notice of Allowance dated Jun. 11, 2018, 29 pages.
U.S. Appl. No. 14/494,364—Response to Final Office Action dated Feb. 5, 2018, filed May 1, 2018, 33 pages.
U.S. Appl. No. 14/494,364—Office Action dated Jun. 27, 2018, 31 pages.
U.S. Appl. No. 15/311,163—Office Action dated Dec. 26, 2018, 47 pages.
"Use Gmail offline with Google Gears," GeniusHackers.Com, https://web.archive.org/web/20090130114621/http://geniushackers.com/blog/2009/01/28/use-gmail-offline-with-google-gears/, Jan. 28, 2009 [downloaded May 29, 2020], 7 pp.
U.S. Appl. No. 15/311,163—Response to Office Action dated Dec. 26, 2018 filed Mar. 26, 2019, 18 pages.
U.S. Appl. No. 15/311,163—Notice of Allowance dated Apr. 19, 2019, 12 pages.
U.S. Appl. No. 15/311,163—Notice of Allowance dated Jul. 29, 2019, 10 pages.
U.S. Appl. No. 15/295,930—Office Action dated Apr. 24, 2019, 8 pages.
U.S. Appl. No. 15/295,930—Response to Office Action dated Apr. 24, 2019 filed Aug. 26, 2019, 14 pages.
U.S. Appl. No. 15/295,930—Notice of Allowance dated Nov. 14, 2019, 15 pages.
PCT/IB16/01593—International Search Report and Written Opinion dated May 22, 2017, 14 pages.
U.S. Appl. No. 15/373,897—Office Action dated Nov. 9, 2017 12 pages.
U.S. Appl. No. 15/373,897—Response to Office Action dated Nov. 9, 2017, filed Apr. 3, 2018, 35 pages.

PCT/IB16/057510—International Preliminary Report on Patentability (Chap 1) dated Jun. 21, 2018, 13 pages.
PCT/IB16/01593—International Preliminary report on Patentability (Chap 1) dated Apr. 26, 2018, 9 pages.
U.S. Appl. No. 15/295,930—Office Action dated Jan. 28, 2019, 33 pages.
Hoffer et al., "Deep metric learning using triplet network." In International Workshop on Similarity-based Pattern Recognition, pp. 84-92. Springer, Cham, 2015.
Zhang et al., "Embedding label structures for fine-grained feature representation," In Proceedings of the IEEE Conference on Computer Vision and Pattern Recognition, 2016, pp. 1114-1123.
"Shop the Look on Google" [online], Sep. 5, 2016 [retrieved on Apr. 4, 2019], Retrieved from the Internet: https://adwords.googleblog.com/2016/09/shop-look-on-google.html, 5 pp.
"Machine Learning" [online], Jul. 23, 2014 [retrieved on May 27, 2020], Wikipedia, Retrieved from the Internet: https://web.archive.org/web/20140723053228/http://en.wikipedia.org/wiki/Machine_learning, 10 pp.
"Inside the Search—Search by Image" [online], May 11, 2014 [retrieved on May 27, 2020], Google, Retrieved from the Internet: https://web.archive.org/web/20140511212330/http://google.com/insidesearch/features/images/searchbyimage.html, 3 pp.
"TinEye Reverse Image Search" [online], May 14, 2014 [retrieved on May 27, 2020], Retrieve from the Internet: https://web.archive.org/web/20140514183935/http://www.tinyeye.com, 2 pp.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pp.
Bengio, Yoshua, "Learning Deep Architectures for AI", Foundations and Trends in Machine Learning, vol. 2, No. 1, published Nov. 15, 2009, pp. 1-71.
Boulton, Clint, "Google Image Swirl Renders Like Google Wonder Wheel" [online], Nov. 17, 2009 [retrieved on May 29, 2020], Retrieved from the Internet: https://www.eweek.com/search-engines/google-image-swirl-renders-results-like-google-wonder-wheel, 5 pp.
Dasgupta, Sanjoy, "Performance Guarantees for Hierarchical Clustering", Conference on Computational Learning Theory, Sydney, Australia, Jul. 8-10, 2002, pp. 351-363, 12 pages.
Van Leuken, Reinier H., et al., "Visual Diversification of Image Search Results", WWW '09 Proceedings of the 18th International Conference on World Wide Web, Apr. 20-24, 2009, Madrid, Spain, p. 341-350.
Tenenbaum, Joshua B., et al., "A Global Geometric Framework for Nonlinear Dimensionality Reduction", Science, vol. 290, Dec. 22, 2000, p. 2319-2323.
"Tf-idf" [online], Feb. 19, 2014 [retrieved on May 29, 2020], Retrieved from the Internet: https://web.archive.org/web/20140219112625/http://en.wikipedia.org/wiki/Tf-idf, 4 pp.
Min, Renqiang, et al., "Deep Supervised t-Distributed Embedding", Proceedings of the 27th International Conference on Machine Learning, Haifa, Israel, Jun. 21-24, 2010, 8 pages.
"Bag-of-words model" [online], Oct. 10, 2013 [retrieved on May 27, 2020], Retrieved from the Internet: https://web.archive.org/web/20131010023013/http://en.wikipedia.org/wiki/Bag-of-words_model, 3 pp.
Cortes, Corinna, et al., "Algorithms for Learning Kernels Based on Centered Alignment", Journal of Machine Learning Research 13, published Mar. 2012, pp. 795-828.
Haussler, David, "Convolution Kernels on Discrete Structures", UCSC-CRL-99-10, University of California at Santa Cruz, Jul. 8, 1999, 38 pages.
Moreno, Pedro J., et al., "A Kullback-Leibler Divergence Based Kernel for SVM Classification in Multimedia Applications", in Advances in Neural Information Processing Systems 16, MIT Press, Jan. 9, 2004, 8 pages.
Lodhi, Huma, et al., "Text Classification using String Kernels", Journal of Machine Learning Research, vol. 2, published Feb. 2002, pp. 419-444.
Siddiquie, Behjat, et al., "Combining Multiple Kernels for Efficient Image Classification", Applications of Computer Vision (WACV), 2009 Workshop on, IEEE, Snowbird, Utah, Dec. 7-9, 2009, 8 pages.

(56) References Cited

OTHER PUBLICATIONS

"Reproducing Kernel Hilbert Space," Wikipedia, http://web.archive.org/web/20131016100346/http://en.wikipedia.org/wiki/Reproducing_kernel_Hilbert_space, Oct. 16, 2013 [downloaded May 29, 2020], 4 pp.
Hoi, Steven C.H., "Semi-Supervised Distance Metric Learning for Collaborative Image Retrieval", Computer Vision and Pattern Recognition, 2008, IEEE Conference on, Jun. 23-28, 2008, Anchorage, Alaska, 7 pages.
Yu, Jie, et al., "A New Study on Distance Metrics as Similarity Measurement", 2006 IEEE International Conference on Multimedia and Expo, Jul. 9-12, 2006, Toronto, Ontario, Canada, pp. 533-536, 4 pages.
Rubner, Yossi, et al., "The Earth Mover's Distance as a Metric for Image Retrieval",Stanford University, Department of Computer Science, Report No. CS-TN-98-86, Sep. 1998, pp. 1-20.
Vadivel, A., et al., "Performance Comparison of Distance Metrics in Content-based Image Retrieval Applications", Proceedings of International Conference on Information Technology, Jan. 2003, pp. 159-164, 6 pages.
"String metric," Wikipedia, http://web.archive.org/web/2013/0904174846/http://en.wikipedia.org/wiki/String_metric, Sep. 4, 2013 [downloaded May 29, 2020], 2 pp.
"Levenshtein distance,", Wikipedia, https://web.archive.org/web/20140717160140/http://en.wikipedia.org/wiki/Levenshtein_distance, Jul. 17, 2014 [downloaded May 27, 2020], 7 pp.
"Faceted search," Wikipedia, https://web.archive.org/web/20140504035320/http://en.wikipedia.org/wiki/Faceted_search, May 4, 2014 [downloaded May 27, 2020], 3 pp.
"Document retrieval," Wikipedia, https://web.archive.org/web/20140404231630/http://en.wikipedia.org/wiki/Document_retrieval, Apr. 4, 2014 [downloaded May 29, 2020], 3 pp.
"Web search engine," Wikipedia, https://web.archive.org/web/20140504005002/http://en.wikipedia.org/wiki/Web_search_engine, May 4, 2014 [downloaded May 29, 2020], 10 pp.
Yang, Jing, et al., "Semantic Image Browser: Bridging Information Visualization with Automated Intelligent Image Analysis", Proc. IEEE Symposium on Visual Analytics Science and Technology (2006), Oct. 31-Nov. 2, 2006, Baltimore, MD, USA, 8 pages.
Schikuta, Erich, "Grid-Clustering" A Fast Hierarchical Clustering Method for very Large Data Sets, Center for Research on Parallel Computing, Rice University, Houston, Texas, CRPC-TR93358, Nov. 1993, 18 pages.
Cai, Deng, et al., "Hierarchical Clustering of WWW Image Search Results Using Visual, Textual and Link Information", MM'04, Oct. 10-16, 2004, New York, NY, 8 pages.
"Linear regression," Wikipedia, https://web.archive.org/web/20140613163108/http://en.wikipedia.org/wiki/Linear_regression, Jun. 13, 2014 [downloaded May 29, 2020], 18 pp.
"Simplex," Wikipedia, https://web.archive.org/web/20140706024911/http://en.wikipedia.org/wiki/Simplex, 12 pp.
"Constrained optimization," Wikipedia, https://web.archive.org/web/20131114055454/http://en.wikipedia.org/wiki/constrained_optimization, Nov. 14, 2013 [downloaded May 29, 2020], 5 pp.
"Nonlinear dimensionality reduction," Wikipedia, https://web.archive.org/web/20131225161033/http://en.wikipedia.org/wiki/Nonlinear_dimensionality_reduction, Dec. 25, 2013 [downloaded May 29, 2020], 10 pp.
"Manifold," Wikipedia, https://web.archive.org/web/20140606042325/http://en.wikipedia.org/wiki/Manifold, Jun. 6, 2014 [downloaded May 29, 2020], 21 pp.
Hinton, Geoffrey and Roweis, Sam, "Stochastic Neighbor Embedding", Advances in Neural Information Processing Systems 15, Dec. 9-14, 2002, pp. 833-840, MIT Press, 8 pages.
"Multidimensional scaling," Wikipedia, https://web.archive.org/web/20140211040227/http://en.wikipedia.org/wiki/Multidimensional_scaling, Feb. 11, 2014 [downloaded May 29, 2020], 5 pp.
"Metric space," Wikipedia, https://web.archive.org/web/20131207121502/http://en.wikipedia.org/wiki/Metric_space, Dec. 7, 2013 [downloaded May 29, 2020], 11 pp.
"Vector space," Wikipedia, https://web.archive.org/web/20140723002807/http://en.wikipedia.org/wiki/Vector_space, Jul. 23, 2014 [downloaded May 29, 2020], 26 pp.
Lanckriet, Gert R.G., et al., "Learning the Kernel Matrix with Semidefinite Programming", Journal of Machine Learning Resarch 5, published Jan. 2004, pp. 27-72.
Souza, Cesar, "Kernel Functions for Machine Learning Applications" [online], Mar. 17, 2010 [retrieved on May 27, 2020], Retrieved from the Internet: http://crsouza.com/2010/03/17/kernel-functions-for-machine-learning-applications/, 22 pp.
Collins et al., "Convolution Kernels for Natural Language", Advances in Neural Information Processing 14, 2001, MIT Press, pp. 625-632, 8 pages.
"String kernel," Wikipedia, https://web.archive.org/web/20131005234915/http://en.wikipedia.org/wiki/String_kernel, Oct. 5, 2013 [downloaded May 29, 2020], 2 pp.
"Radial basis function kernel," Wikipedia, https://web.archive.org/web/20140711061128/http://en.wikipedia.org/wiki/RBF_kernel, Jul. 11, 2014 [downloaded May 29, 2020], 2 pp.
"Polynomial kernel," https://we.archive.org/web/20140413092034/http://en.wikipedia.org/wiki/Polynomial_kernel, Apr. 13, 2014 [downloaded May 27, 2020], 2 pp.
"Kernel method," Wikipedia, https://web.archive.org/web/20140608030258/http://en.wikipedia.org/wiki/Kernel_method, Jun. 8, 2014 [downloaded May 27, 2020], 4 pp.
"Bregman divergence," Wikipedia, https://web.archive.org/web/20121018041028/http://en.wikipedia.org/wiki/Bregman_divergence, Oct. 18, 2012 [downloaded May 27, 2020], 4 pp.
"Distance," Wikipedia, https://web.archive.org/web/20140301042810/http://en.wikipedia.org/wiki/distance, Mar. 1, 2014 [downloaded May 29, 2020], 6 pp.
Balasubramanian, Mukund, and Schwartz, Eric L., "The Isomap Algorithm and Topological Stability", Science, vol. 295, Jan. 4, 2002, p. 7a, 3 pages.
"Metric Tree," Wikipedia, https://web.archive.org/web/20131019183134/http://en.wikipedia.org/wiki/Metric_tree, Oct. 19, 2013 [downloaded May 29, 2020], 2 pp.
Ishiwaka et al., "MindReader: Querying Databases Through Multiple Examples," VLDB'98, Proceedings of 24th International Conference on Very Large Data Bases, Aug. 24-27, 1998, New York City, pp. 218-227.
Drucker et al., "Support Vector Machines: Relevance Feedback and Information Retrieval," Information Processing and Management 38 (2002), pp. 305-323 (accepted May 11, 2001).
Rui et al., "Relevance Feedback: A Power Tool for Interactive Content-Based Image Retrieval," Circuits and Systems for Video Technology, IEEE Transactions on, vol. 8, No. 5, Sep. 1998, pp. 1-13.
Tieu et al., "Boosting Image Retrieval," International Journal of Computer Vision 56(1/2), pp. 17-36, 2004 (Accepted Jul. 16, 2003).
Tong, et al., "Support Vector Machine Active Learning for Image Retrieval," In Proceedings of the ACM International Conference on Multimedia, 12 pages, ACM Press, 2001.
Kovashka, et al., "WhittleSearch: Image Search with Relative Attribute Feedback," Proceedings of the IEEE Conference on Computer Vision and Pattern Recognition (CVPR) (2012) 8 pages.
Zhou, Xiang Sean, and Thomas S. Huang. "Relevance feedback in image retrieval: A comprehensive review." Multimedia systems 8.6 (2003), 25 pages.
Manning et al., Introduction to Information Retrieval, Chapter 9: Relevance Feedback and Query Expansion, Cambridge University Press, Apr. 1, 2009, pp. 177-194.
He, Jingrui, et al. "Manifold-ranking based image retrieval." Proceedings of the 12th annual ACM international conference on Multimedia. ACM, 2004, pp. 9-16.
Zhang, et al., "iFind—A System and Semantics and Feature Based Image Retrieval over Internet," Proc. ACM Multimedia, ACM Press, 2000, 2 pp.
Vinay, et al. "Evaluating relevance feedback algorithms for searching on small displays." Advances in Information Retrieval. Springer Berlin Heidelberg, 2005. 185-199.

(56) References Cited

OTHER PUBLICATIONS

Datta, R., et al., "Image Retrieval: Ideas, Influences, and Trends of the New Age," ACM Computing Surveys (CSUR) 40.2, 2008, 66 pp.
Tao et al., "Asymmetric Bagging and Random Subspace for Support Vector Machines-Based Relevance Feedback in Image Retrieval," IEEE Transactions on Pattern Analysis and Machine Intelligence, vol. 28, No. 7, Jul. 2006, pp. 1088-1099.
Cox, et al. "Pichunter: Bayesian relevance feedback for image retrieval." Pattern Recognition, 1996., Proceedings of the 13th International Conference on. vol. 3. IEEE, 1996, 9 pages.
"Rocchio Algorithm," https://web.archive.org/web/2015031822071/http://en.wikipedia.org/wiki/Rocchio_algorithm, Mar. 18, 2015 [downloaded May 27, 2020], 3 pp.
"Online machine learning" [online], Apr. 6, 2015 [retrieved on May 27, 2020], Retrieved from the Internet: https://web.archive.org/web/20150406170656/http://en.wikipedia.org/wiki/Online_machine_larning, 5 pp.
"Multi-armed bandit," Wikipedia, https://web.archive.org/web/20150331085305/http://en.wikipedia.org/wiki/Multi-armed_bandit, Mar. 31, 2015 [downloaded May 27, 2020], 10 pp.
"K-mean clustering," Wikipedia, https://web.archive.org/web/20150412222522/http://en.wikipedia.org/wiki/K-means_clustering, Apr. 12, 2015 [downloaded May 29, 2020], 14 pp.
"K-medoids," Wikipedia, https://web.archive.org/web/20150330092112/http://en.wikipedia.org/wiki/K-medoids, Mar. 30, 2015 [downloaded May 29, 2020], 6 pp.
Brisaboa et al., "Spatial Selection of Sparse Pivots for Similarity Search in Metric Spaces," JCS&T vol. 7 No. 1, Apr. 2007, 6 pages.
Elad, et al., "Content Based Retrieval of VRML Objects—An Iterative and Interactive Approach," Springer Vienna, 2002, 12 pages.
PCT/IB2015/001267—International Search Report and Written Opinion dated Oct. 15, 2015, 9 pages.
Cesa-Bianchi et al., "Prediction, Learning, and Games," Cambridge University Press, 2006, 403 pages.
PCT/IB2015/001267—International Preliminary Report on Patentability dated Nov. 15, 2016, 7 pages.
Johnson, "Approximation Algorithms for Combinatorial Problems", MIT, 1974, pp. 38-49.
Allesiardo, et al., "A Neural Networks Committee for the Contextual Bandit Problem." Neural Information Processing. Springer International Publishing, 8 pages (2014).
Bouneffouf, et al., "A contextual-bandit algorithm for mobile context-aware recommender system." Neural Information Processing. Springer Berlin Heidelberg, 9 Pages (2012).
Burnetas et al., "Optimal adaptive policies for sequential allocation problems." Advances in Applied Mathematics 17.2 (1996): 122-142.
Gittins, "Bandit processes and dynamic allocation indices." Journal of the Royal Statistical Society. Series B (Methodological) (1979): 148-177.
Honda and Takemura, "An asymptotically optimal policy for finite support models in the multiarmed bandit problem." Machine Learning 85.3 (2011): 361-391.
Katehakis et al., "Sequential choice from several populations." Proceedings of the National Academy of Sciences of the United States of America 92.19 (1995): 8584-8585.
Katehakis et al., "The multi-armed bandit problem: decomposition and computation." Mathematics of Operations Research 12.2 (1987): 262-268.
Lai et al., "Asymptotically efficient adaptive allocation rules." Advances in applied mathematics 6.1 (1985): 4-22.
Langford and Zhang, "The Epoch-Greedy Algorithm for Contextual Multi-armed Bandits," In Advances in Neural Information Processing Systems, 8 pp., 2008.
Ortner, "Online regret bounds for Markov decision processes with deterministic transitions." Theoretical Computer Science 411.29 (2010): 2684-2695.
Perchet et al., "The multi-armed bandit problem with covariates." The Annals of Statistics, 41(2), 30 pages (2013).
Press, "Bandit solutions provide unified ethical models for randomized clinical trials and comparative effectiveness research." Proceedings of the National Academy of Sciences 106, No. 52 (2009): 22387-22392.
Rigollet, et al., "Nonparametric bandits with covariates." arXiv preprint arXiv:1003.1630, 18 pages (2010).
Robbins, "Some aspects of the sequential design of experiments." In Herbert Robbins Selected Papers, pp. 527-535 (1952).
Scott, "A modern Bayesian look at the multi-armed bandit." Applied Stochastic Models in Business and Industry 26.6 (2010): 639-658.
Slivkins, "Contextual bandits with similarity information." The Journal of Machine Learning Research 15.1, 30 pages (2014).
Tewari and Bartlett, "Optimistic linear programming gives logarithmic regret for irreducible MDPs." Advances in Neural Information Processing Systems, 8 pages (2008).
Tokic, "Adaptive $\epsilon$-greedy exploration in reinforcement learning based on value differences," KI 2010: Advances in Artificial Intelligence, Springer Berlin Heidelbergt, 8 pp. 2010.
Tokic et al., "Value-difference based exploration: adaptive control between epsilon-greedy and softmax." KI 2011: Advances in Artificial Intelligence. Springer Berlin Heidelberg, 12 pages (2011).
Valko, et al. "Finite-time analysis of kernelised contextual bandits." arXiv preprint arXiv:1309.6869, 10 pages (2013).
Vermorel et al., "Multi-armed bandit algorithms and empirical evaluation." Machine Learning: ECML 2005. Springer Berlin Heidelberg, 2005. 437-448.
Walsh, et al., "Exploring compact reinforcement-learning representations with linear regression," In Proceedings of the Twenty-Fifth Conference on Uncertainty in Artificial Intelligence, AUAI Press, pp. 591-598 (2009).
Weber, "On the Gittins index for multiarmed bandits," The Annals of Applied Probability 2.4 (1992): 1024-1033.
"Package WeightedCluster," https://cran.r-project.org/packages/WeightedCluster/WeightedCluster.pdf, Feb. 19, 2015 [downloaded May 29, 2020], 16 pp.
"Bayes' theorem," Wikipedia, https://web.archive.org/web/20161107223719/http://en.wikipedia.org/wiki/Bayes'_theorem, Nov. 7, 2016 [downloaded May 27, 2020], 12 pp.
"Thompson sampling," Wikipedia, https://web.archive.org/web/20161025043013/http://en.wikipedia.org/wiki/Thompson_sampling, Oct. 25, 2016 [downloaded May 29, 2020], 3 pp.
Cristianini, Nello, "Kernel Methods for Pattern Analysis," UC Davis, nello@support-vector.net, [downloaded May 29, 2020], 31 pp.
"Random projection," Wikipedia, https://web.archive.org/web/20150906023635/https://en.wikipedia.org/wiki/Random_projection, Sep. 6, 2015 [downloaded May 27, 2020], 2 pp.
"Metropolis-Hastings algorithm," Wikipedia, https://web.archive.org/web/20160123051755/http://en.wikipedia.org/wiki/Metropolis-Hastings_algorithm, Jan. 23, 2016 [downloaded May 29, 2020], 7 pp.
Chapelle et al, An empirical evaluation of thompson sampling, Advances in neural information processing systems. 2011, 9 pages.
Kingma, Diederik et al., "Auto-Encoding Variational Bayes", 14 pages, May 1, 2014, eprint arXiv:1312.6114v10.

\* cited by examiner

1500

1510 —

1520 —

1530 —

CONTENT EMBEDDING USING DEEP METRIC LEARNING ALGORITHMS

CROSS-REFERENCE TO OTHER APPLICATIONS

Applicants hereby claim the benefit under 35 U.S.C. 119(e) of U.S. provisional application No. 62/348,097, filed 9 Jun. 2016. The provisional application is hereby incorporated by reference herein for its teachings.

The following applications are incorporated by reference herein: U.S. application Ser. No. 14/494,364, entitled "VISUAL INTERACTIVE SEARCH," by Nigel Duffy, filed 23 Sep. 2014; U.S. provisional application No. 61/994,048, entitled "VISUAL INTERACTIVE SEARCH," by Nigel Duffy, filed 15 May 2014; PCT application No. PCT/IB2015/001267, entitled "VISUAL INTERACTIVE SEARCH," by Nigel Duffy, filed 4 May 2015; and U.S. Provisional Application No. 62/347,540, entitled "SCALABLE BANDIT-BASED VISUAL INTERACTIVE SEARCH" by Vivek Ramamurthy, Vinit Garg, and Nigel Duffy, filed 8 Jun. 2016.

FIELD OF THE TECHNOLOGY DISCLOSED

The technology disclosed generally relates to creating content embeddings using deep metric machine learning algorithms in the form of neural networks, and in particular relates to using convolutional neural networks for populating an embedding space of data that can be used for performing various types of searching.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The invention relates generally to a tool for generating training data for models and for developing models that provide the ability to search for digital documents in an interactive and visual way, such as, for example visual product discovery. Examples of digital documents include: photographs; images; product descriptions; webpages and the like. Hereinafter, the term documents, digital documents, images, products, product descriptions, etc. may be used synonymously. For example these models can be used to generate content embeddings (i.e., an embedding space, which is described in more detail below) and implement a tool that may be used on a mobile device to search for products available for sale via an online retailer.

Current computer search technologies allow users to perform queries and respond to those queries with an ordered list of results. The queries may be implemented using a structured query language, natural language text, speech, and/or a reference image for pattern recognition. However, the results returned often do not satisfy the user's search goal. The user then proceeds to refine or modify the query in an attempt to better achieve desired goals.

Regarding queries that are implemented using reference images and pattern recognition, computer systems for providing results based on a user's search goal have been used in the past. For example, conventionally, computer systems have been used to perform pattern recognition by relying upon, for example, matching an image of interest with a previously known pattern and then reacting accordingly. An example of an image of interest is an image that has been identified as being similar to what the user is searching for. The problem with this approach is that one must have a large library of previously known patterns that match the image of interest. If the image of interest is significantly different from the images in the large library of previously known patterns, then the computer system will provide an unreliable result. Further, in order to increase the accuracy of this conventional approach, the number of previously known patterns must be increasingly large. These problems have made it difficult for conventional systems to reliably and efficiently perform pattern recognition. Further, these problems have made it difficult to fully utilize the computing power that is available and to fully utilize the many practical applications of pattern recognition.

These above-described problems of conventional pattern recognition can be resolved by various applications of neural networks for pattern recognition. Various novel approaches of training neural networks and then utilizing the trained neural networks to generate content embeddings (i.e., an embedding space) for pattern recognition are described herein.

SUMMARY OF THE INVENTION

The methods described herein address these challenges by providing novel ways to train neural networks for developing models and by providing novel ways to develop training data for training the neural networks for eventually developing the models.

Described herein is a method of training a neural network to create an embedding space including a catalog of documents, the method including providing a plurality of training sets of K+2 training documents to a computer system, each training document being represented by a corresponding training vector x, each set of training documents including a target document represented by a vector $x^t$, a favored document represented by a vector $x^s$, and K>1 unfavored documents represented respectively by vectors $x_i^u$, where i is an integer from 1 to K, and each of the vectors including a plurality of input vector elements, for each given one of the training sets, passing, by the computer system, the vector representing each document of the training set through a neural network to derive a corresponding output vector $y^t$, a corresponding output vector $y^s$, and corresponding output vectors $y_i^u$, each of the output vectors including a plurality of output vector elements, the neural network including a set of adjustable parameters which dictate an amount of influence that is imposed on each input vector element of an input vector to derive each output vector element of the output vector, adjusting the parameters of the neural network so as to reduce a loss L, which is an average over all of the output vectors $y_i^u$ of $[D(y^t,y^s)-D(y^t, y_i^u)]$, where D is a distance between two vectors, and for each given one of the training sets, passing the vector representing each document of the training set through the neural network having the adjusted parameters to derive the output vectors.

Further described herein is a method of training a neural network to create an embedding space including a catalog of documents, the method including obtaining a set of K+2 training documents, the set of K+2 documents including a target document represented by a vector $x^t$, a favored document represented by a vector $x^s$ and unfavored documents represented by vectors $x_i^u$, where i is an integer from 1 to K and K>1, passing each of the vector representations of the set of K+2 training documents through a neural network to derive corresponding output vectors, including vector $y^t$ derived from the vector $x^t$, vector $y^s$ derived from the vector $x^s$ and vectors $y_i^u$ respectively derived from vectors $x_i^u$, and repeatedly adjusting parameters of the neural network through back propagation until a sum of differences calculated from (i) a distance between the vector $y^t$ and the vector $y^s$ and (ii) distances between the vector $y^t$ and each of the vectors $y_i^u$ satisfies a predetermined criteria, wherein the sum of differences corresponds to a likelihood that the favored document will be selected over the unfavored documents.

Additionally described herein is a method of generating a production embedding space including one or more catalogs of documents by training a new model using a computer system, the method including obtaining raw data representing documents from a new data domain, the documents represented by the raw data being unlabeled with no information regarding a measure of dissimilarity between any the documents, providing the obtained raw data to a general purpose model to obtain non-production embeddings of the documents represented as non-production vectors, providing the documents represented as the non-production vectors to a production system that implements algorithms to identify, as document predictions, certain documents represented as intermediary vectors from the non-production embeddings in dependence a target document, receiving training data generated by a mechanical turk identifying a vector representation of a selected document selected from the document predictions in dependence on the target document, training, by the computer system, the new model using the received training data to obtain a trained model, and generating the production embedding space by feeding data representing documents into the trained model to obtain the production embedding space that includes vector representations of each of the documents.

Furthermore, described herein is a method of generating a production embedding space including one or more catalogs of documents by training a new model using a computer system, the method including obtaining raw data representing documents from a new data domain, the documents represented by the raw data being unlabeled with no information regarding a measure of dissimilarity between any the documents, providing the obtained raw data to a variational autoencoder to obtain non-production embeddings of the documents represented as non-production vectors, providing the documents represented as the non-production vectors to a production system that implements algorithms to identify, as document predictions, certain documents represented as intermediary vectors from the non-production embeddings in dependence a target document, receiving training data generated by a mechanical turk identifying a vector representation of a selected document selected from the document predictions in dependence on the target document, training, by a computer system, the new model using the received training data to obtain a trained model, and generating the production embedding space by feeding data representing documents into the trained model to obtain the production embedding space that includes vector representations of each of the documents.

Also, described herein is a method of generating production embeddings including one or more catalogs of documents by training an existing model using a computer system, the method including obtaining raw data representing documents from an existing data domain for which the existing model has been trained, the documents represented by the raw data being unlabeled with no information regarding a measure of dissimilarity between any of the documents, providing the obtained raw data to the existing model to obtain non-production embeddings of the documents represented as non-production vectors, providing the documents represented as the non-production vectors to a production system that implements algorithms to identify, as document predictions, certain documents represented as intermediary vectors from the non-production embeddings in dependence on a target document, receiving training data generated by a mechanical turk identifying a vector representation of a selected document selected from the document predictions in dependence on the target document, training, by the computer system, the existing model using the received training data to obtain an updated and trained model, and generating the production embedding space by feeding data representing documents into the updated and trained model to obtain the production embedding space that includes vector representations of each of the documents.

Each of the above-described methods can also be implemented as a non-transitory computer readable storage medium impressed with computer program instructions. The instruction when executed on a processor, can implement any of the above-described methods. Further, each of the above-described methods can be implemented including one or more processors coupled to memory. The memory can be loaded with computer instructions to implement any of the above-described methods.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the clauses, specification and drawings.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

INTRODUCTION TO MACHINE LEARNING

Figure 1:
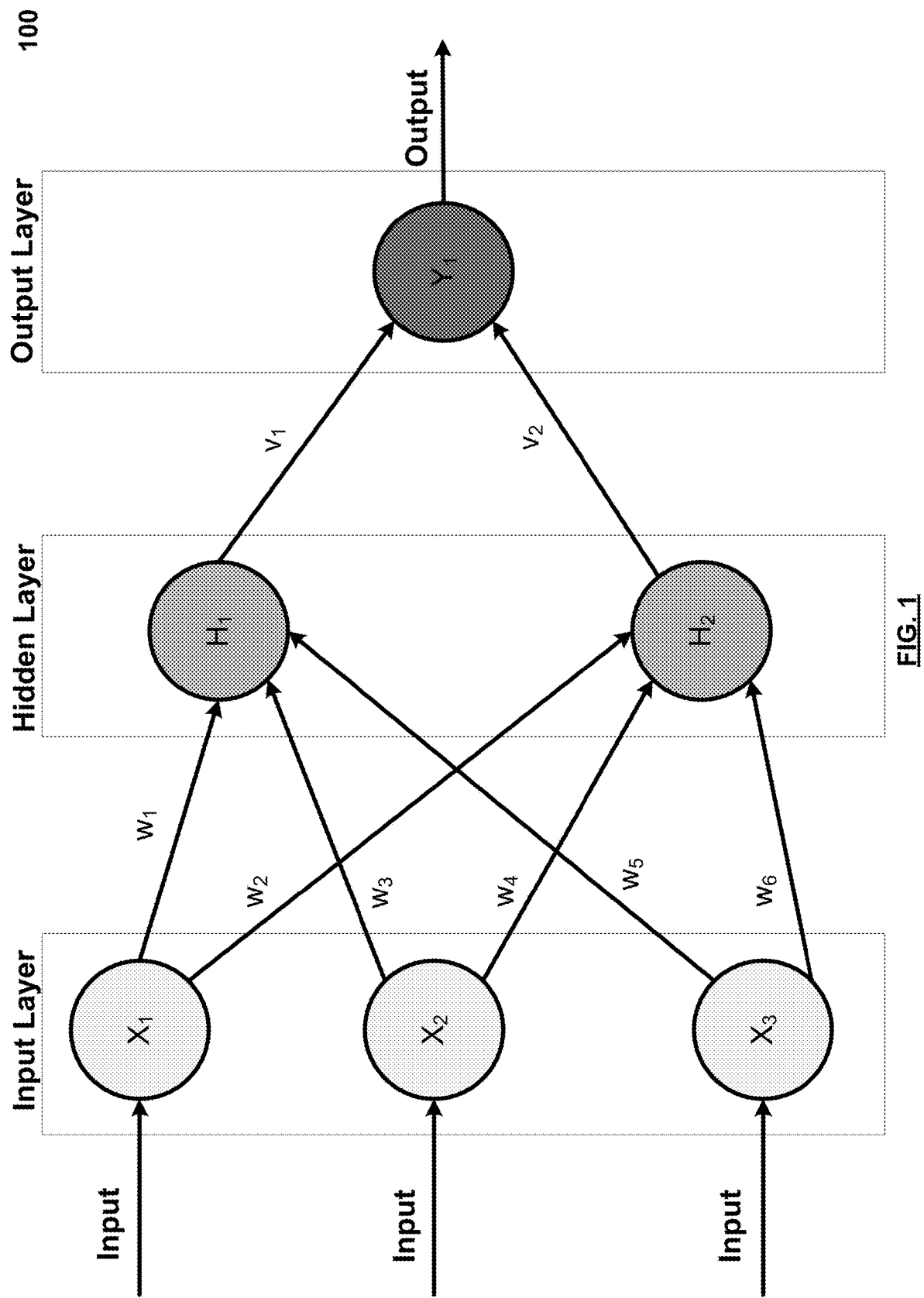
FIG. 1 illustrates an example of a neural network with multiple layers.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Some of the technology described in this introduction and various implementations thereof are also described in "Visual Product Discovery" (Nigel Duffy, et al., submitted for KDD Workshop on Fashion Meets Machine Learning, Aug. 13, 2016, San Francisco, Calif.), which is incorporated herein by reference.

In machine learning neural networks are essentially computer models that are structured based on biological neural networks and are used to, through a learning process, estimate unknown functions that are dependent on a large number of inputs. Neural networks are basically an assembly of interconnected "neurons" that exchange messages between one another. Each of the connections between the neurons has a specific numeric weight that can be fine-tuned through a learning process based on various inputs and considering various outputs. Eventually the numeric weights can be sufficiently tuned to provide correct outputs. The tuning of these numeric weights is often times referred to as training the neural network. A better trained neural network provides more accurate results. This concept allows neural networks to be capable of learning and adapting to various inputs, including previously unseen inputs.

There are many applications for neural networks, some of which include visual recognition and classification (e.g., pattern recognition) as well as speech recognition. For example, a neural network for visual recognition can include a set of input neurons which may be activated by in input image. For example, an input image, let's say that the input image is a color image including 64 pixels (e.g., an 8-by-8 pixel image). Each of the input neurons can be activated using the red, blue green (RGB) values of a particular pixel of the 64 pixels of an input image. After being weighted and transformed by a function, the activations (i.e., outputs) of the neurons of one "layer" are then passed on to other neurons of another "layer." This process is repeated through all of the intermediary layers of the neural network until finally, an output neuron of an output layer determines which type of image was input. A neural network that has one intermediary layer is typically considered to be a shallow neural network and a neural network having two or more intermediary layers is considered a deep neural network that can perform deep learning.

FIG. 1 illustrates an example of a neural network with multiple layers.

Referring to FIG. 1, a neural network 100 is illustrated, where the neural network 100 includes an input layer, a hidden layer and an output layer. Neural network 100 is a system of neurons (e.g., $X_1$, $X_2$, $X_3$, $H_1$, $H_2$ and $Y_1$) that exchange messages between each other. This example neural network 100 includes three inputs, three neurons in the input layer, two neurons in the hidden layer and one neuron in the output layer. Typically neural networks have many more layers and many more neurons. The neural network 100 of FIG. 1 is just provided as an example to convey the high-level structure of neural networks. As mentioned above, this example neural network 100 is a shallow neural network because there is only one hidden layer. However, this concept is the same for deep neural networks, there are just multiple hidden layers. The hidden layer may implement a specific function and the output layer may implement another specific function. In this example, there are six connections between the neurons of the input layer and the hidden layer, where each of the connections has a numeric weight (e.g., $w_1$, $w_2$, $w_3$, $w_4$, $w_5$, and $w_6$). Further, there are two connections between the neurons of the hidden layer and the neuron of the output layer, where each of the connections has a numeric weight (e.g., $v_1$ and $v_2$). Each of the numeric weights can be adjusted during a training process, so that a properly trained network responds correctly when fed an image (or other type of data) to recognize.

For image/pattern recognition, the neural network 100 would typically have many more inputs in the input layer. Referring to the example above, for an image of 64 pixels (i.e., an 8-by-8 pixel image), there would be 192 inputs (i.e., 64*3, where 3 represents the 3 RGB color channels). Therefore, the input layer would have inputs $X_1$ through $X_{192}$. There also may be more than one output. For example, if the purpose of the neural network 100 was to identify a handwritten number 5, there might be two outputs, $Y_1$ and $Y_2$, where $Y_1$ represents a percentage that the neural network 100 believes that the input image is the number 5 and $Y_2$ represents a percentage that the neural network 100 believes that the input image is NOT the number 5. Another example would be the neural network 100 having 10 outputs for number recognition, where each output is the probability that the input image representing a number is a certain number from 0 to 9. Other examples of using two or more outputs of a neural network could include classifying objects, such as humans, animals and inanimate objects.

Neural networks must be trained to be able to provide accurate outputs or predictions. Training of the neural network is typically done by providing the network with training data. For example, the neural network that is being used to identify the handwritten number 5 should be trained with various examples of handwritten number 5s. The more examples of handwritten number 5s that the neural network is trained with the more likely the neural network is to be able to correctly identify a newly provided handwritten number 5.

Referring back to FIG. 1, the input layer processes the inputs provided thereto, the hidden layer processes the output from the input layer based on the weights of the connections between the input layer and the hidden layer. The output layer takes the output from the hidden layer and processes it based on the weights of the connections between the hidden layer and the output layer. The neural network 100 can include multiple layers of feature-detecting neurons. For example, as touched on above, there can be multiple hidden layers. Each layer has many neurons that respond to different combinations of inputs from the previous layers. FIG. 1 only illustrates two hidden nodes for the hidden layer. However, each hidden layer could include more nodes or just a single node. For pattern recognition and classification, the layers of the neural network 100 are arranged (and trained) so that, for example, a first layer of the hidden layers detects a set of primitive patterns (e.g., presence of a human) from the input data, a second layer of the hidden layers detects patterns of patterns (e.g., is the human a male or a female) and a third layer of the hidden layers detects patterns of those patterns (e.g., is the female a child or an adult, etc.) and so on.

In deep metric learning, a convolutional neural network (CNN) can be used to solve various machine learning tasks and to create useful representations of data. Specifically, a CNN can generate data sets that distinguish between available classes of data. A CNN may initially break a large image (e.g., an 8,100 pixel image, such as a 90-by-90 pixel block) into smaller blocks of overlapping images (e.g., 64 pixel images, such as 8-by-8 pixel blocks), where each of the smaller blocks is individually fed into the CNN to output an array of data. This technique can be used to identify patterns between smaller blocks that overlap one another. Specific implementations of CNNs that perform explicit deep metric learning are a Siamese network and variants thereof. A Siamese network can compute an embedding vector for each of its input images and then computes a measure of similarity (or dissimilarity) between, for example, two embedding vectors. This similarity (or dissimilarity) can then be used to form a loss function. The loss function can be used to train a neural network to compute similar embedding vectors for similar images and dissimilar embedding vectors for dissimilar images. In other words, the loss function can be used to further train the neural network to be able to distinguish between similar pairs of data and pairs of data that are not similar.

One type of CNN inspired by the Siamese network is a triplet network, which has been implemented for the purpose of learning a ranking function for image retrieval. Ranking is different than classification, because ranking will rank each image with respect to a target image. For example, if the target image is a red ball, each other input into the triplet network will be ranked with respect to similarity to the red ball, such that a pink ball would be ranked closer to the red ball than a black ball. A triplet network can, for a given set of images $\mathbb{P}$ and a rough measure $r(x, x')$ between images $x$ and $x'$ provided by a training oracle (e.g., a human-in-the-loop training system), learn a distance function $D(x, x')$, where D represents a distance between two images x and x', such that $D(x, x^+) > D(x, x')$, $\forall x, x^+, x^- \in \mathbb{P}$, for which $r(x, x^+) > r(x, x^-)$ (i.e., for all of x, $x^+$ and $x^-$ images of set $\mathbb{P}$, the rough measure r of distance of x and $x^+$ is greater than x and $x^-$). The distance D can be a gradient distance, Euclidean distance, or any other type of measurable distance. This triplet network is described in further detail below.

Figure 2:
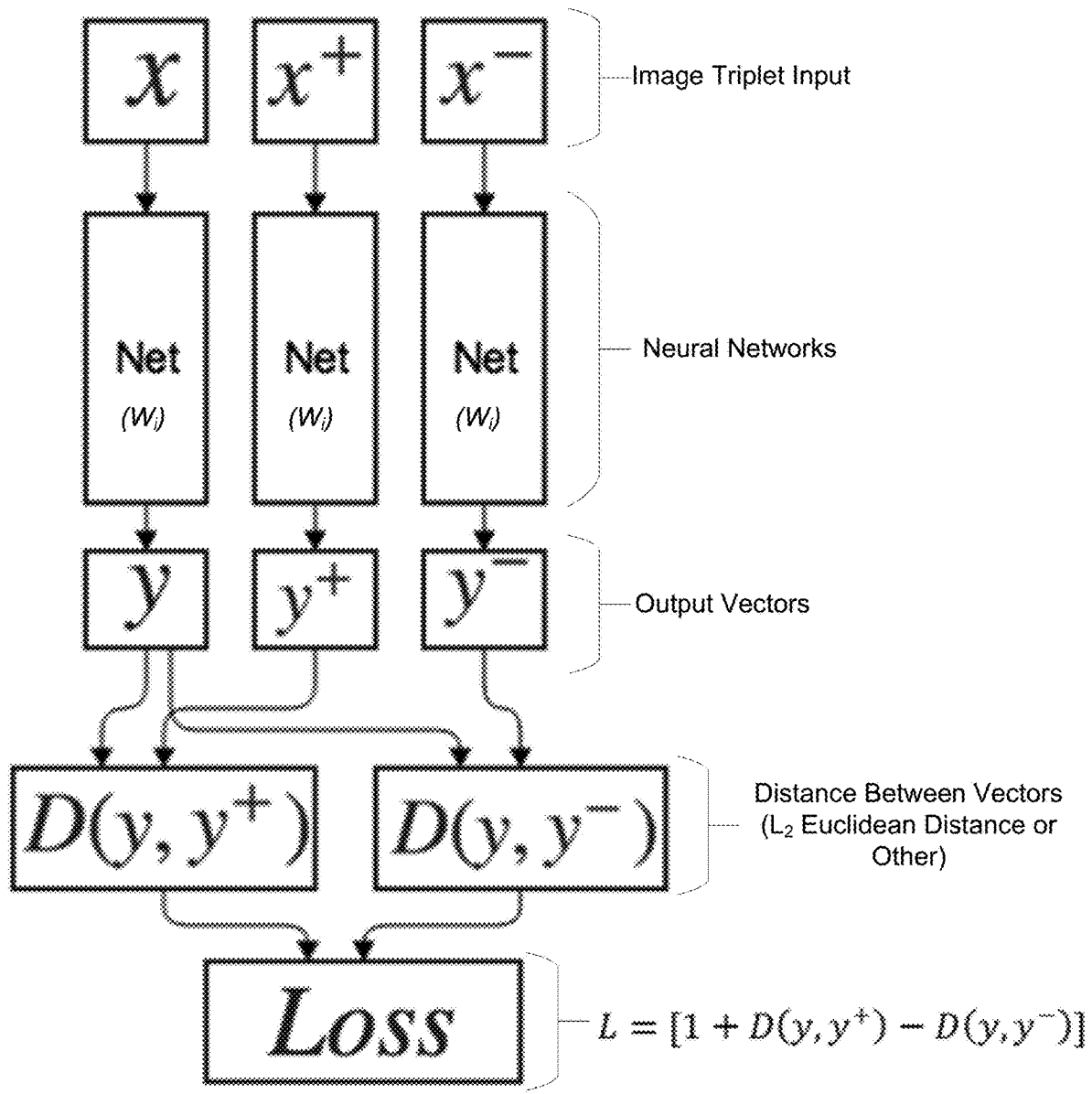
FIG. 2 illustrates a triplet network structure utilizing convolutional neural networks.

FIG. 2 illustrates a triplet network structure utilizing convolutional neural networks.

Referring to FIG. 2, a triplet network 200 is illustrated, where an input of the triplet network 200 is an image triplet $(x, x^+, x^-)$. Each image of the image triple is composed of many pixels. Referring to the example above, each image could include 64 individual pixels, each having an RGB value. Therefore, for example, 64 pixel values representing image x, are input into 196 (64*3) different input nodes (neurons) of the neural network Net. For the sake of illustration each of the 196 nodes (neurons) is not represented in FIG. 2. The same holds for image, $x^+$ and, $x^-$. After forward propagation through neural network Net with shared weights $W_i$ a vector representation y, $y^+$ $y^-$ can be obtained and then a distance $L_2$ between embeddings $y^+ = Net(x^+)$ and $y^- = Net(x^-)$ and the reference $y = Net(x)$ can be calculated. Referring to FIG. 2, the distance between embeddings y and $y^+$ is identified as $D(y, y^+)$ and the distance between embeddings y and $y^-$ is identified as $D(y, y^-)$. After calculating the distances between the embeddings, a loss L (or error) can be calculated as $L = [1 + D(y, y^+) - D(y, y^-)]$. As the loss L becomes closer to zero, the lower the error. A low error rate indicates that distances between the embeddings output from the neural network satisfy that $y^+$ is closer to y than $y^-$ is by a margin of 1. The weights $W_i$ of the network Net can be trained using back propagation. Back propagation simply means that a gradient of the loss L is fed back into the neural network Net so that the weights can be adjusted to minimize the loss L as desired by the user. This is extremely useful when the user expects a certain result and the weights can be adjusted until the desired result is reached.

However, using this triplet network 200 poses several potential shortcomings when the triplet network 200 is applied in the context of visual product discovery. A key shortcoming is that, in the field, customers are (implicitly) repeatedly choosing which product from among a set of more than two products is the most similar to the product that they want. In order to more accurately determine how the customers' behaviors should affect the entire system's (e.g., a visual product discovery system) estimates of the customer's interests, a better type of network can be used to model how the customers will behave when given more than two choices.

Accordingly, an opportunity arises to provide deep metric learning algorithms and provide new architectures, such as a kernel learning architecture, a K-Net network architecture, a far from random regularization architecture, a far from random unsupervised learning architecture, an auto-encoder regularization architecture in a triplet network, and a new way of generating training data for training neural networks.

DETAILED DESCRIPTION

Figure 3:
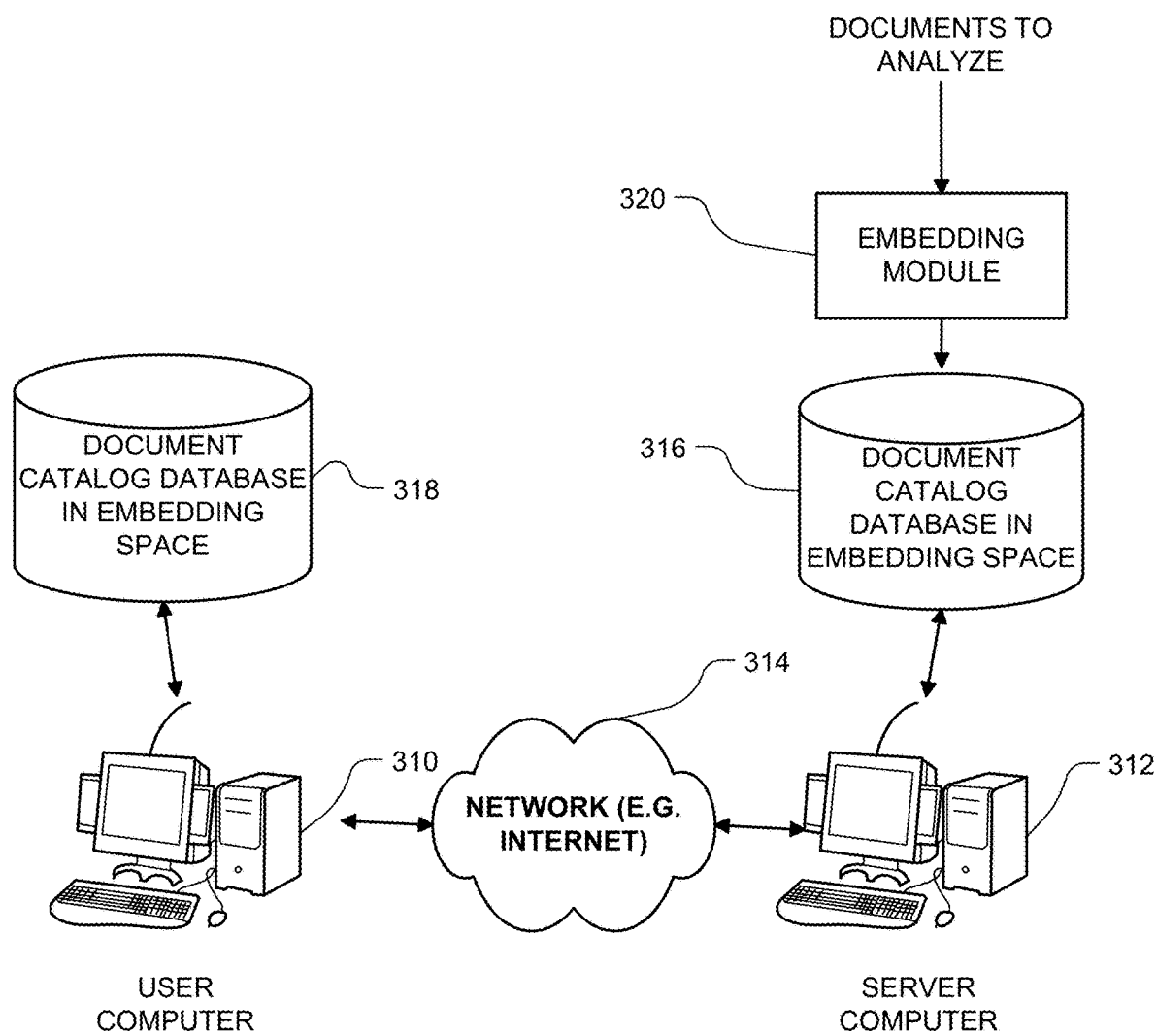
FIG. 3 illustrates an implementation of deep metric algorithms for providing a collection of documents in an embedding space.

FIG. 3 illustrates an implementation of a system that uses deep metric algorithms to provide a collection of documents in an embedding space, which can then be visually searched. A detailed description of embedding documents and an embedding space (e.g., content embedding) is provided below with reference to FIGS. 4-9B.

Referring to FIG. 3, an example environment 300 is illustrated, in which various aspects of the present disclosure may be implemented. The example environment 300 includes a user computer 310 and a server computer 312, connected to each other via a network 314 such as the Internet. The server computer 312 has accessibly thereto a document catalog database 316 (in an embedding space) identifying documents in association with embedding information, such as relative distances and/or their positions in a vector space. The user computer 310 also in various embodiments may or may not have accessibly thereto a document catalog database 318 (in an embedding space) identifying the same information.

An embedding module 320 (which may for example be the server computer 312 or a separate computer system or a process running on such a computer) analyzes a catalog of documents to extract embedding information about the documents. For example, if the documents are photographs, the embedding module 320 (i) may include a triplet network structure utilizing a neural network, (ii) may use deep learning to derive embedding image information from the photographs and (ii) may be an actual model new or existing already created using training data. The embedding module 320 can create an embedding space having the image information embedded therein. As discussed below in detail, training data may be generated using the server computer 312 using the embedding data or embeddings output from the embedding module 320. Further, as briefly mentioned above, the embedding module 320 may be implemented by the server computer 312 or any other computer and may also implement a new domain model or an existing (previously trained) model for producing production (live) embeddings based on previously seen data or new data.

Alternatively, the embedding module 320 may derive a library of image classifications (axes on which a given photograph may be placed), each in association with an algorithm for recognizing in a given photograph whether (or with what probability) the given photograph satisfies that classification. Then the embedding module 320 may apply its pre-developed library to a smaller set of newly provided photographs, such as the photos currently on the user computer 310, in order to determine embedding information applicable to each photograph. Either way, the embedding module 320 writes into the document catalog database 316 the identifications of the catalog of documents that the user may search, each in association with its embedding information.

In yet another embodiment, the embedding information that embedding module 320 writes into the document catalog database 316 may be provided from an external source, or entered manually.

The iterative identification steps described above can be implemented in a number of different ways. In one embodiment, all computation takes place on the server computer 312, as the user iteratively searches for a desired document. The user, operating the user computer 310, sees all results only by way of a browser. In this embodiment, it is not necessary that the user computer 310 have the document catalog database 318 accessibly thereto. In another embodiment, the server computer 312 transmits its entire document catalog database 318 of documents in embedding space (or a subset of that database) to the user computer 310, which writes it into its own document catalog database 318. All computation takes place on the user computer 310 in such an embodiment, as the user iteratively searches for a desired document. Many other arrangements are possible as well. Before a description of the various new architectures is provided, we provide a description of embedding documents, determining a distance between two documents in an embedding, database organization and specific implementations of embedding specific documents in an embedding space.

Embedding of the Documents

A catalog of digital documents (e.g., images, text, webpages, catalog entries, sections of documents, etc.) can be embedded in an embedding space and stored in a database. Though this group of documents may be referred to herein as a "catalog," the use of that term is not intended to restricted the group to documents that might be found in the type of catalog that a retail store might provide. In the database, a distance is identified between each pair of the documents in the embedding space corresponding to a predetermined measure of dissimilarity between the pair of documents.

The "embedding space," into which (digital) documents are embedded by the embedding module 320 (see FIG. 3) can be a geometric space within which documents are represented. In one implementation the embedding space can be a vector space and in another implementation the embedding space can be a metric space. In a vector space, the features of a document define its "position" in the vector space relative to an origin. The position is typically represented as a vector from the origin to the document's position, and the space has a number of dimensions based on the number of coordinates in the vector. Vector spaces deal with vectors and the operations that may be performed on those vectors.

When the embedding space is a metric space, the embedding space does not have a concept of position, dimensions or an origin. Distances among documents in a metric space are maintained relative to each other, rather than relative to any particular origin, as in a vector space. Metric spaces deal with objects combined with a distance between those objects and the operations that may be performed on those objects.

For purposes of the present disclosure, these objects are significant in that many efficient algorithms exist that operate on vector spaces and metric spaces. For example metric trees may be used to rapidly identify objects that are "close" to each other. Objects can be embedded into vector spaces and/or metric spaces. In the context of a vector space this means that a function can be defined that maps objects to vectors in some vector space. In the context of a metric space it means that it is possible to define a metric (or distance) between those objects, which allows the set of all such objects to be treated as a metric space. Vector spaces allow the use of a variety of standard measures of distance (divergence) including the Euclidean distance. Other implementations can use other types of embedding spaces.

As used herein, "an embedding" is a map which maps documents into an embedding space. Typically an embedding is a function which takes, as inputs, a potentially large number of characteristics of the document to be embedded. For some embeddings, the mapping can be created and understood by a human, whereas for other embeddings the mapping can be very complex and non-intuitive. In many implementations the latter type of mapping is developed by a machine learning algorithm based on training examples, rather than being programmed explicitly.

In order to embed a document catalog in a vector space each document must be associated with a vector. A distance between two documents in such a space is then determined using standard measures of distance using vectors.

A goal of embedding documents in a vector space is to place intuitively similar documents close to each other. There are many ways to achieve this. For example a common way of embedding text documents is to use a bag-of-words model. The bag of words model maintains a dictionary. Each word in the dictionary is given an integer index, for example, the word aardvark may be given the index 1, and the word zebra may be given the index 60,000. Each document is processed by counting the number of occurrences of each dictionary word in that document. A vector is created where the value at the $i^{th}$ index is the count for the $i^{th}$ dictionary word. Variants of this representation normalize the counts in various ways. Such an embedding captures information about the content and therefor the meaning of the documents. Text documents with similar word distributions are close to each other in this embedded space.

There are many other possibilities by which documents may be embedded into a vector space. For example images may be processed to identify commonly occurring features using, e.g., scale invariant feature transforms (SIFT), which are then binned and used in a representation similar to the bag-of-words embedding described above. Further, embeddings can be created using deep neural networks, or other deep learning techniques. For example a neural network can learn an appropriate embedding by performing gradient descent against a measure of dimensionality reduction on a large set of training data. As another example, a kernel can be learned based on data and derive a distance based on that kernel. Likewise distances may be learned directly. These approaches generally use large neural networks to map documents, words, or images to high dimensional vectors (for example see: A brief introduction to kernel classifiers, Mark Johnson, Brown University 2009, http://cs.brown.edu/courses/cs195-5/fall2009/docs/lecture_10-27.pdf "Using Confidence Bounds for Exploitation-Exploration Trade-offs, incorporated herein by reference; and Kernel Method for General Pattern Analysis, Nello Cristianini, University of California, Davis, accessed October 2016, http://www.kernel-methods.net/tutorials/KMtalk.pdf).

In other implementations, an embedding can be learned using examples with algorithms such as Multi-Dimensional Scaling, or Stochastic Neighbor Embedding. An embedding into a vector space may also be defined implicitly via a kernel. In this case the explicit vectors may never be generated or used, rather the operations in the vector space are carried out by performing kernel operations in the original space.

Other types of embeddings of particular interest capture date and time information regarding the document, e.g., the date and time when a photograph was taken. In such cases a kernel may be used that positions images closer if they were taken on the same day of the week in different weeks, or in the same month but different years. For example, photographs taken around Christmas may be considered similar even though they were taken in different years and so have a large absolute difference in their timestamps. In general, such kernels may capture information beyond that available by simply looking at the difference between timestamps.

Similarly, embeddings capturing geographic information may be of interest. Such embeddings may consider geographic meta-data associated with documents, e.g., the geo-tag associated with a photograph. In these cases a kernel or embedding may be used that captures more information than simply the difference in miles between two locations. For example, it may capture whether the photographs were taken in the same city, the same building, or the same country.

Often embeddings will consider documents in multiple ways. For example, a product may be embedded in terms of the meta-data associated with that product, the image of that product, and the textual content of reviews for that product. Such an embedding may be achieved by developing kernels for each aspect of the document and combining those kernels in some way, e.g., via a linear combination.

In many cases a very high dimensional space would be required to capture the intuitive relationships between documents. In some of these cases the required dimensionality may be reduced by choosing to embed the documents on a manifold (curved surface) in the space rather than to arbitrary locations.

Different embeddings may be appropriate on different subsets of the document catalog. For example, it may be most effective to re-embed the candidate result sets at each iteration of the search procedure. In this way the subset may be re-embedded to capture the most important axes of variation or of interest in that subset.

To embed a document catalog in a metric space requires associating that catalog with a distance (or metric).

Distances Between Digital Documents

A "distance" between two documents in an embedding space corresponds to a predetermined measurement (measure) of dissimilarity among documents. Preferably it is a monotonic function of the measurement of dissimilarity. Typically the distance equals the measurement of dissimilarity. Example distances include the Manhattan distance, the Euclidean distance, and the Hamming distance.

Given the distance (dissimilarity measure) between documents to be searched, or the embedding of those documents into a vector space, a metric space or a manifold, there are a variety of data structures that may be used to index the document catalog and hence allow for rapid search. Such data structures include metric trees, kd-trees, R-trees, universal B-trees, X-trees, ball trees, locality sensitive hashes, and inverted indexes. The system can use a combination of such data structures to identify a next set of candidate results based on a refined query. An advantage of using geometric constraints is that they may be used with such efficient data structures to identify next results in time that is sub-linear in the size of the catalog.

There are a wide variety ways to measure the distance (or dissimilarity) between documents, and these may be combined to produce new measures of distance. An important concept is that the intuitive relationships between digital documents may be captured via such a similarity or distance measure. For example, some useful distance measures place images containing the same person in the same place close to each other. Likewise, some useful measures place documents discussing the same topic close to each other. Of course there are many axes along which digital documents may be intuitively related, so that the set of all documents close (with respect to that distance) to a given document may be quite diverse. For example, a historical text describing the relationship between Anthony and Cleopatra may be similar to other historical texts, texts about Egypt, texts about Rome, movies about Anthony and Cleopatra, and love stories. Each of these types of differences constitutes a different axis relative to the original historical text.

Such distances may be defined in a variety of ways. One typical way is via embeddings into a vector space. Other ways include encoding the similarity via a Kernel. By associating a set of documents with a distance we are effectively embedding those documents into a metric space. Documents that are intuitively similar will be close in this metric space while those that are intuitively dissimilar will be far apart. Note further that kernels and distance functions may be learned. In fact, it may be useful to learn new distance functions on subsets of the documents at each iteration of the search procedure.

Note that wherever a distance is used to measure the dissimilarity between documents a kernel may be used to measure the similarity between documents instead and viceversa. In particular, in the sequel we will refer to the use of distances, e.g., in the definition of constraints. However, kernels may be used directly instead without the need to transform them into distances.

Kernels and distances may be combined in a variety of ways. In this way multiple kernels or distances may be leveraged. Each kernel may capture different information about a document, e.g., one kernel may capture visual information about a piece of jewelry, while another captures price, and another captures brand.

Also note that embeddings may be specific to a given domain, such as a given catalog of products or type of content. For example, it may be appropriate to learn or develop an embedding specific to men's shoes. Such an embedding would capture the similarity between men's shoes be would be uninformative with regard to men's shirts.

Database Organization

The databases used in an implementation of the present disclosure, such as document catalog databases 316 and 318 as illustrated in FIG. 3, may use commonly available means to store the data in, e.g., a relational database, a document store, a key value store, or other related technologies. In each case the original document contents (or pointers to them) may be stored and associated with their high dimensional representation, or a set of measures of distance relative to other documents.

In order to achieve scalable and fast search performance indexing structures are critical. When documents are embedded in a vector space indexes may be built using, e.g., kd-trees. When documents are associated with a distance metric and hence embedded in metric space metric trees may be used.

The databases described herein are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein.

Specific Implementations of Embedding Documents in an Embedding Space

FIGS. 4, 5, 6, 7, 8, 9A and 9B illustrate specific implementations of embedding documents in an embedding space according to an implementation of the present disclosure. Specifically, FIGS. 4-9B illustrate a set of documents embedded in 2-dimensional space. Aspects of the present disclosure envision embedding documents in spaces of large dimensionality, hence two dimensions is for illustration purposes only.

Figure 4:
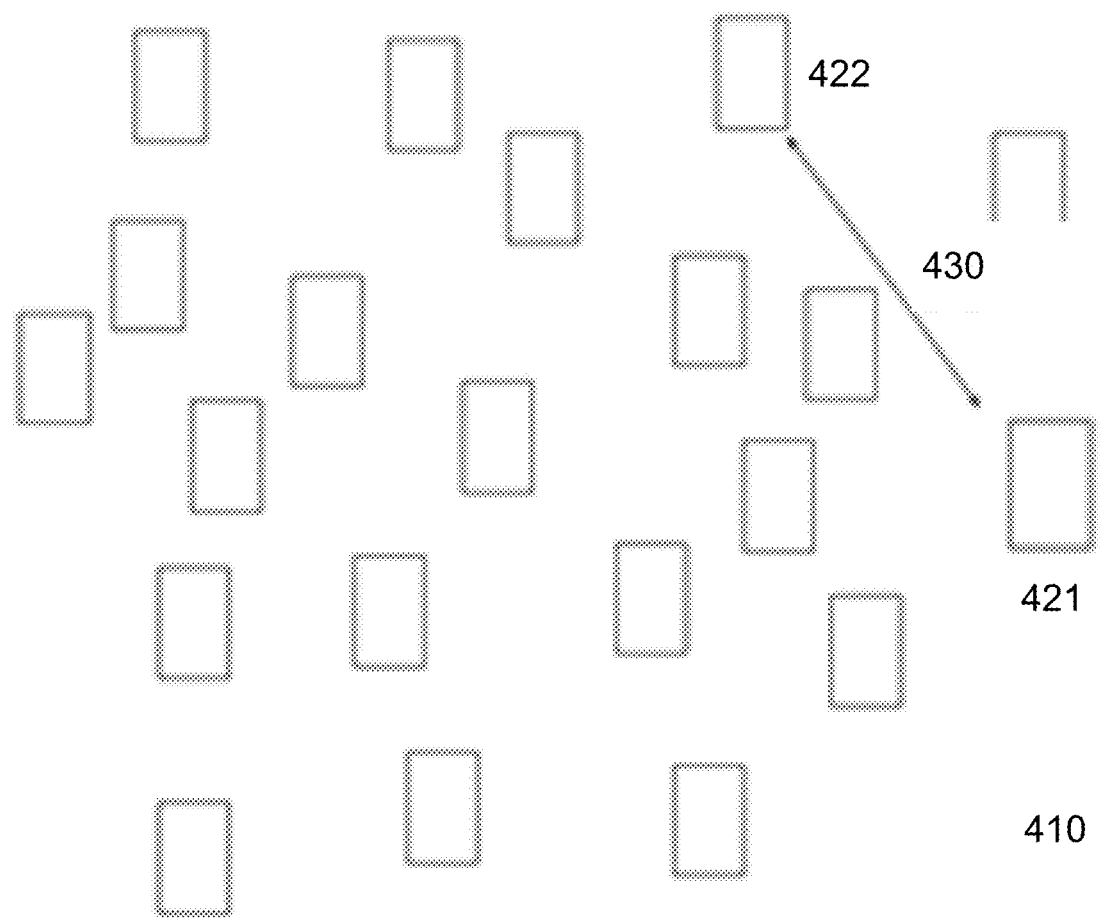
FIGS. 4, 5, 6, 7, 8, 9A and 9B illustrate specific implementations of embedding documents in an embedding space according to an implementation of the present disclosure.

Referring to FIG. 4, a space 410 contains documents, e.g., 421, 422. Each pair of documents has a distance 430 between them.

Figure 5:
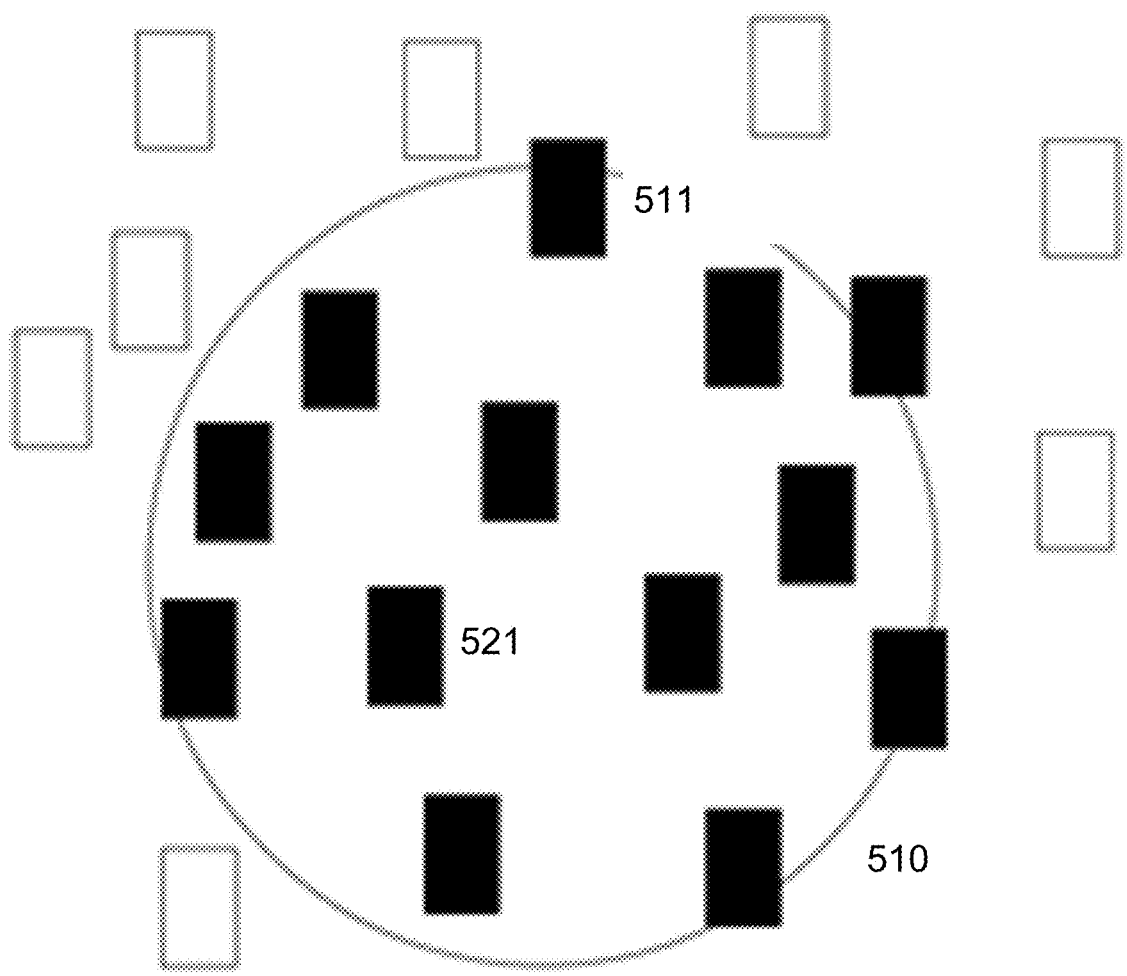

Referring to FIG. 5, the set of documents from FIG. 5 is illustrated in addition to a circular geometric constraint 510. Those documents inside the circle, e.g., 521 and 511 are said to satisfy the constraint. Aspects of the present disclosure express queries and user input in the form of such geometric constraints. The documents that satisfy the constraints are the current results of the query. As the user provides further input additional constraints may be added, or existing constraints may be added or removed.

Figure 6:
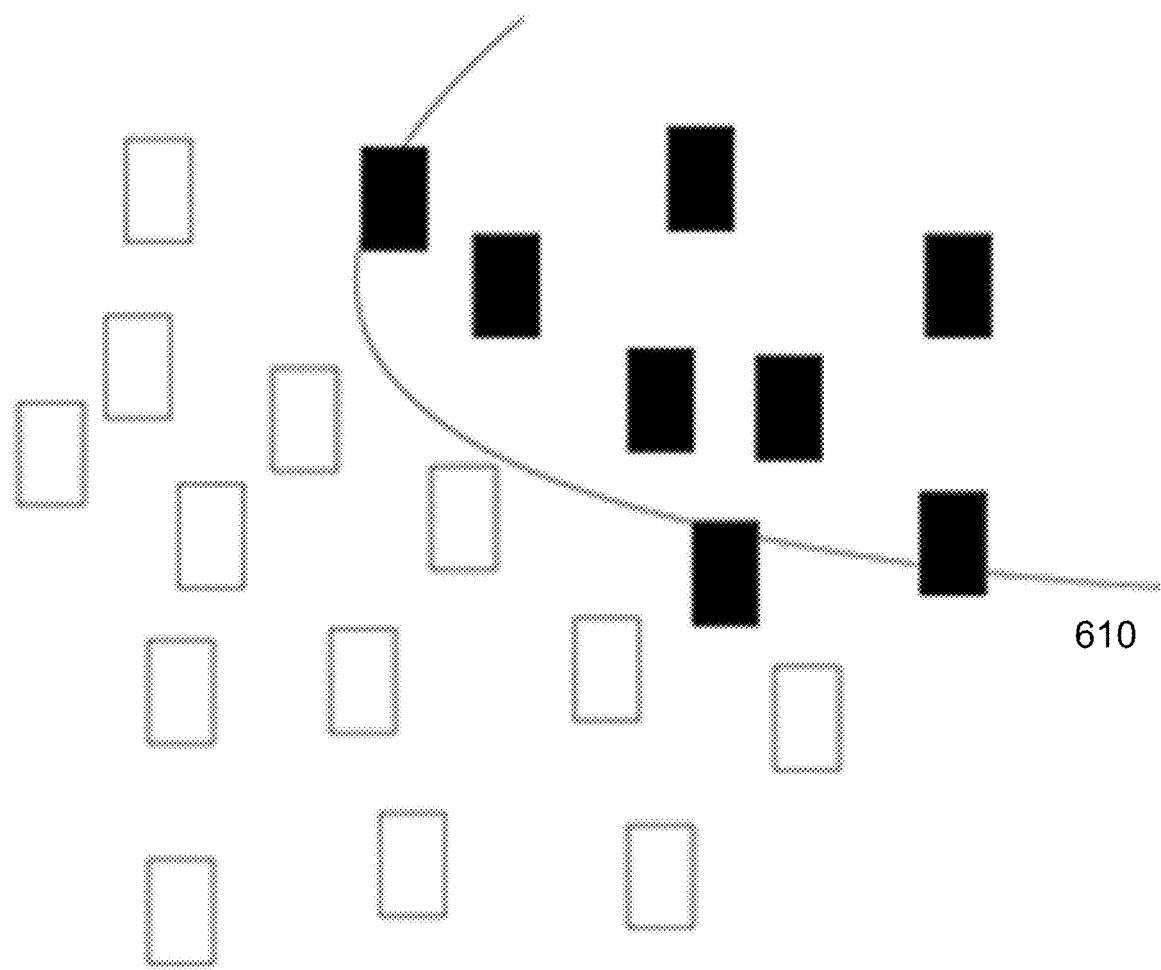

Referring to FIG. 6, the set of documents from FIG. 4 is illustrated in addition to a non-circular geometric constraint 610. Various implementations may include geometric constraints of an arbitrary shape, and unions, intersections and differences of such constraints.

Figure 7:
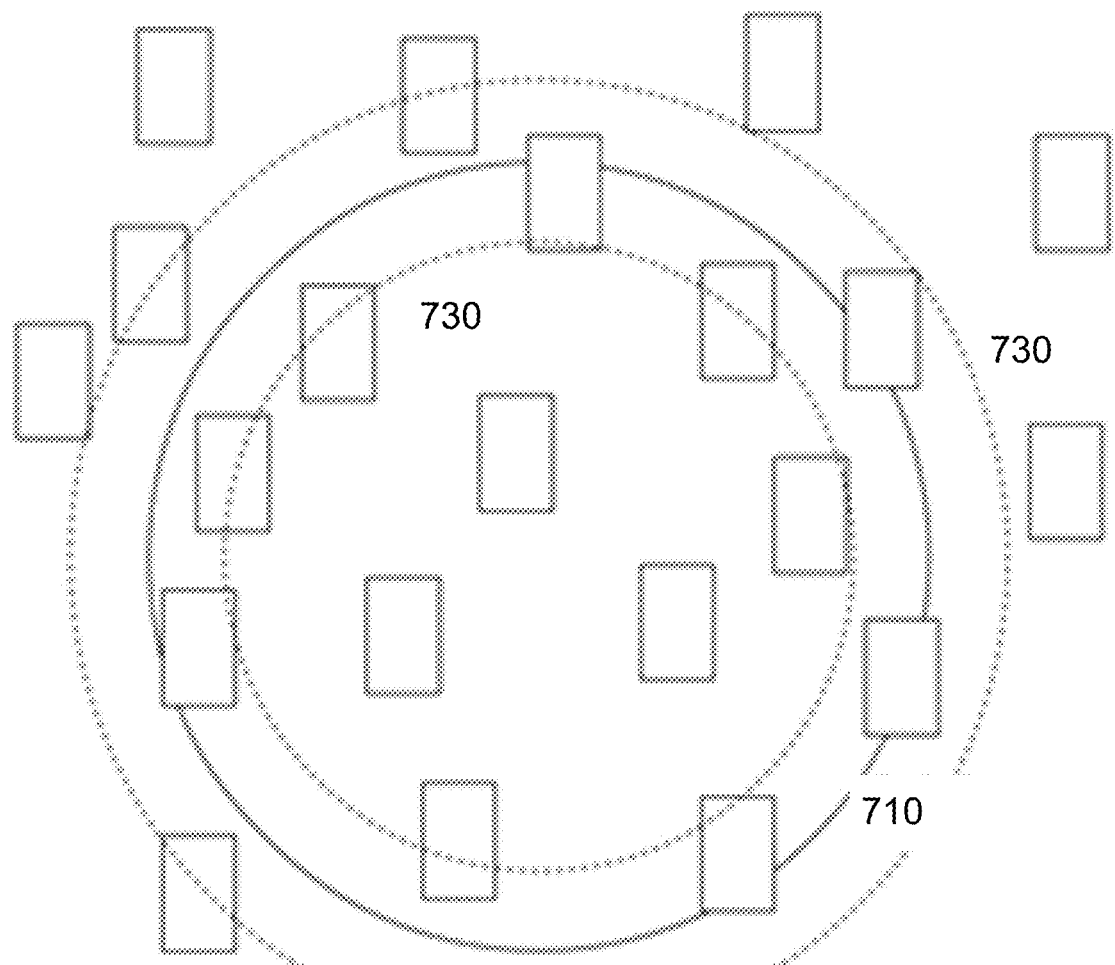

Referring to FIG. 7, a means by which the circular constraint of FIG. 5 may be updated in response to user input is illustrated. An original circular constraint 710 may be modified by increasing its radius to produce circular constraint 720, or by decreasing its radius to produce circular constraint 730. These modifications are done in response to user input. The set of documents satisfying these constraints will change as the constraints are modified thus reducing or expanding the set of images considered for display to the user.

Figure 8:
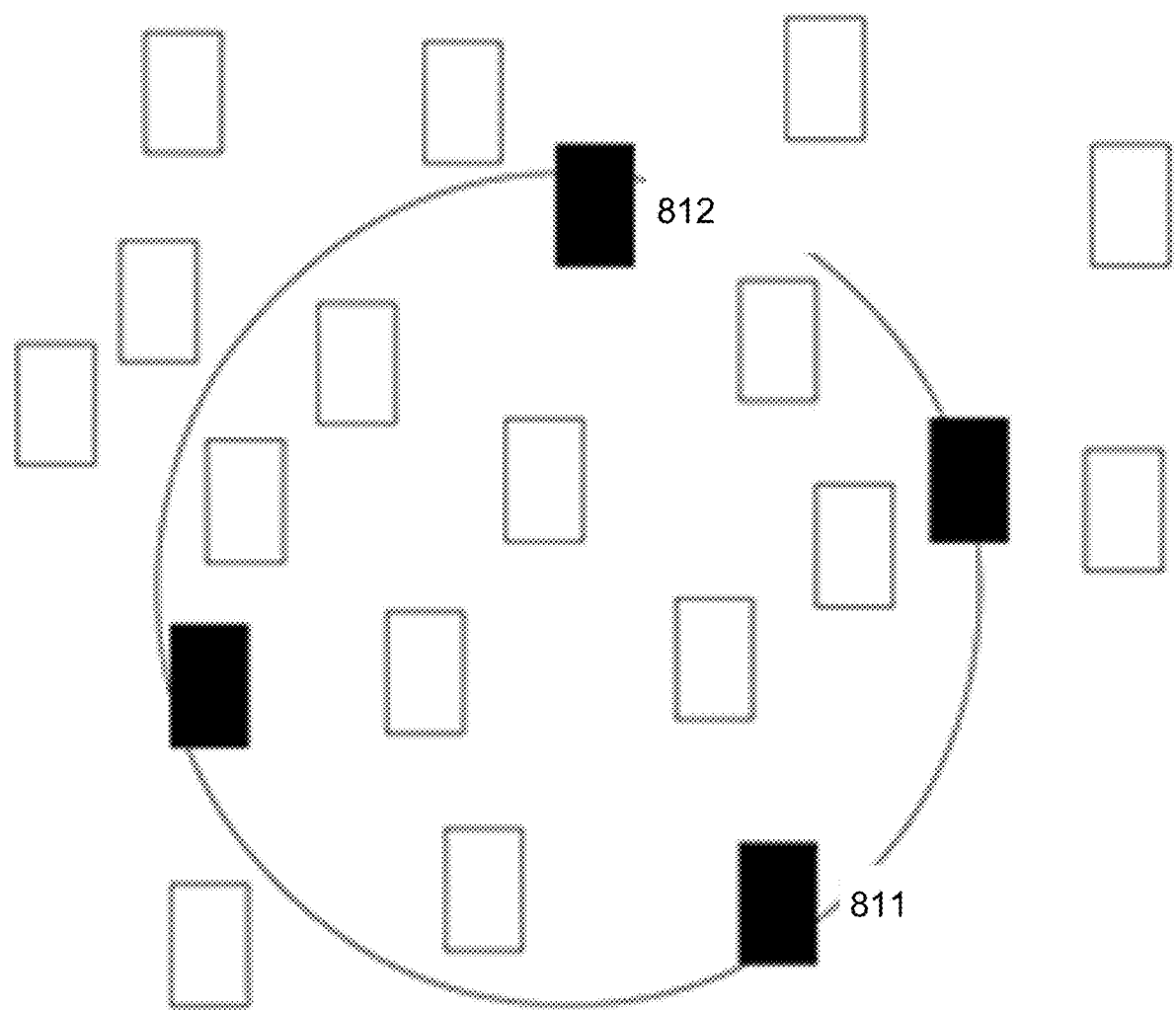

Referring to FIG. 8, a means by which a discriminative subset of documents may be selected for presentation to the user is illustrated. The documents highlighted, e.g., 811 and 812, are distinct from each other and from the others contained in the circular constraint region.

Figure 9A:
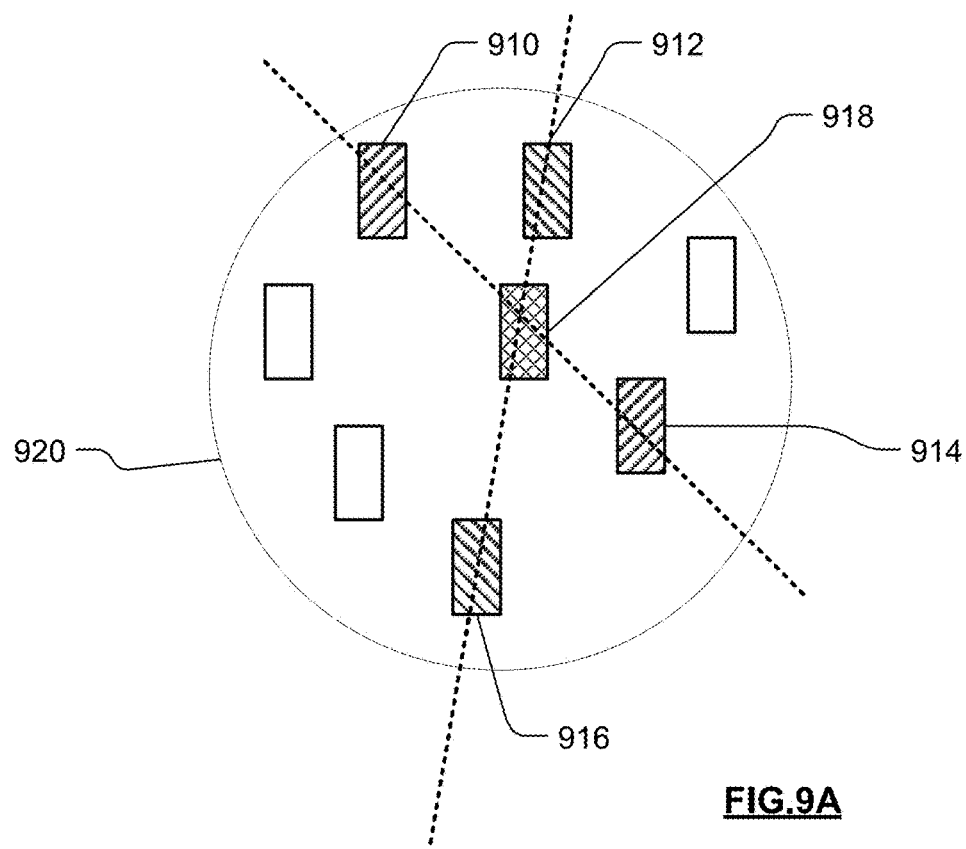

Referring to FIG. 9A, a set of documents in embedding space is illustrated, in which the collection has been narrowed to the documents within the circle 920, and has identified a primary result document 918. In addition, documents 910, 912, 914 and 916 can be selected as a set to present to the user. In the embedding space, documents 912, 918 and 916 are substantially collinear, and documents 910, 918 and 914 are substantially collinear.

Figure 9B:
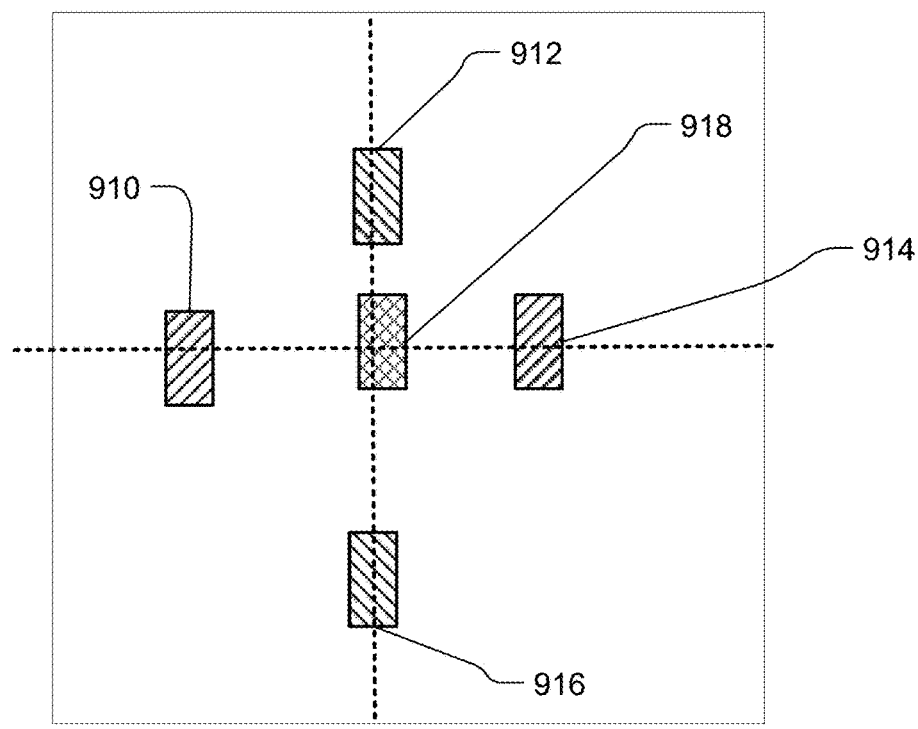

Referring to FIG. 9B, an illustration is provided to describe how the system may present the set of documents in layout space (the broken lines are implied, rather than visible). The specific positions of the documents do not necessarily match those in embedding space, in part because dimensionality of the space has been reduced. However, documents which were substantially collinear in embedding space are collinear in layout space. In particular, if the broken lines in FIG. 9A represent dimensions in embedding space along which the candidate documents differ, the placement of the documents in layout space in FIG. 9B are indicative of those same dimensions. In addition, the relative distances among the documents along each of the lines of collinearity in layout space also are indicative of the relative distances in embedding space.

Kernel Learning

Figure 10:
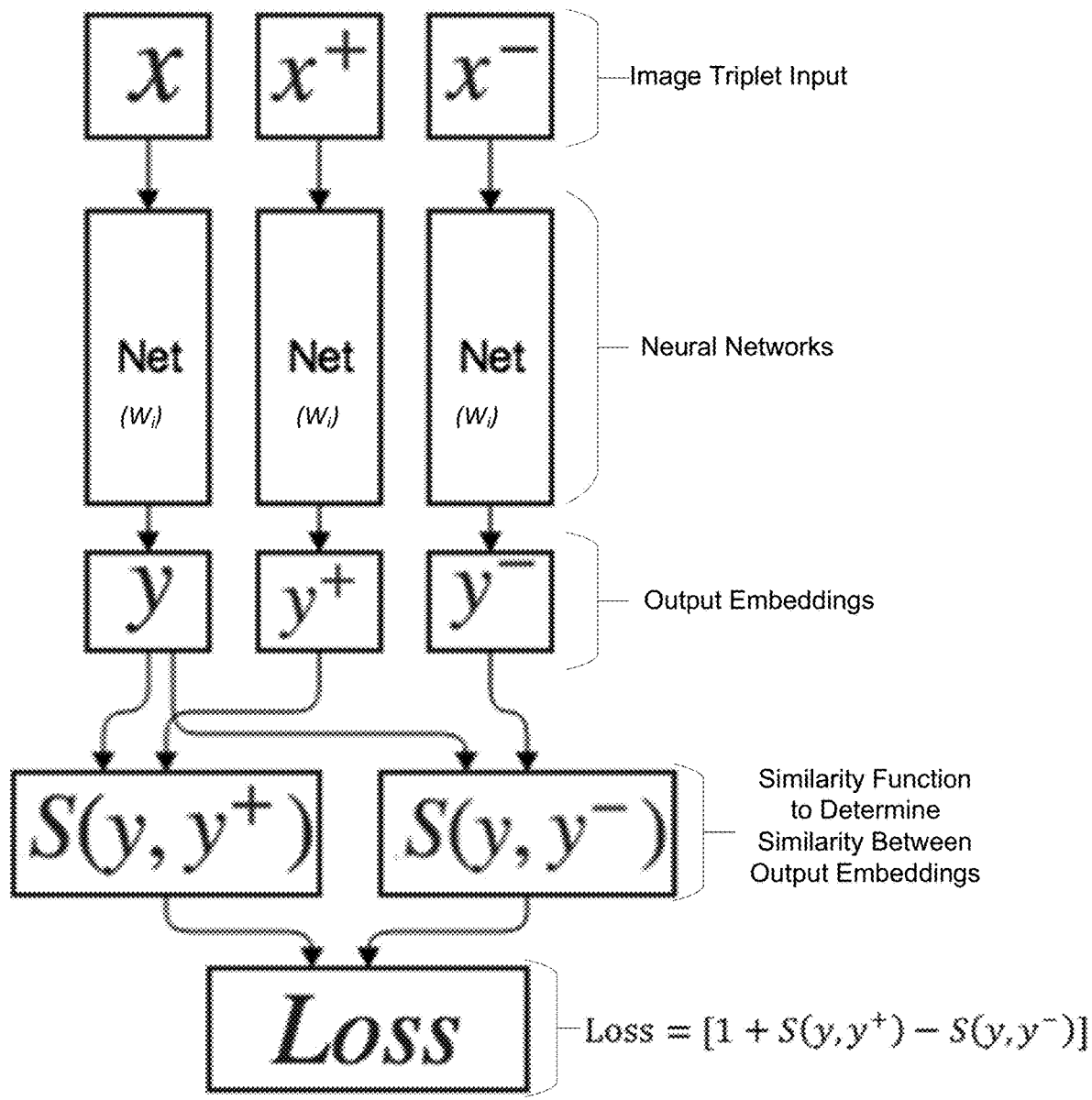
FIG. 10 illustrates a modified triplet network structure that utilizes kernel learning, according to an embodiment of the present invention.

FIG. 10 illustrates a modified triplet network structure that is trained using kernel learning, according to an embodiment of the present invention.

Referring to FIG. 10 a modified triplet network 1000 is illustrated, where an input of the triplet network 1000 is an image triplet $(x, x^+, x^-)$, where image x is closer to image $x^+$ than to image $x^-$. This is known, for example, because the each of the images of the image triplet have been labeled or conditioned using, for example, an oracle or a Mechanical Turk, which is described in further detail below. There can be many sets of image triplets to be used as training data. After forward propagation through neural network Net with shared weights $W_i$, an embedding (e.g., a vector or a matrix) representation y, $y^+$ $y^-$ can be obtained. Embedding y having been obtained from image x, embedding $y^+$ having been obtained from image $x^+$, and embedding $y^-$ having been obtained from image $x^-$. The dimensionality of the vectors or matrices output from the neural network Net will depend upon architecture of the neural network Net. Next a similarity function can be applied to embeddings $y^+$, $y^-$ and y, where $y^+$=Net($x^+$) and $y^-$=Net($x^-$) and the reference y=Net(x). The dimensionality of the vectors or matrices output from the neural network Net will depend upon architecture of the neural network Net.

Referring to FIG. 10, the similarity between embeddings y and $y^+$ is identified as $S(y, y^+)$ and the similarity between embeddings y and y⁻ is identified as S(y, y⁻). After calculating the similarities between the embeddings, a loss L (or error) can be calculated as L=[1+S(y, y⁺)−S(y, y⁻)]. As the loss L becomes closer to zero, the lower the error and the greater the probability that a user would click or select y⁺. The loss may also be calculated using mean square distance of a softmax function or any other known methods, such as cross-entropy or log likelihood. After all of the sets of training data are propagated through the neural network Net (e.g., one epoch), the losses can be used to update the neural network Net and then the training data can be used again. Accordingly, the weights $W_i$ of the network Net can be trained using back propagation to eventually train the network to recognize that image x is closer to image x⁺ than to image x⁻.

Specifically, the back propagation adjusts the weights $W_i$ of the network Net starting with the weights nearest to the outputs of the network Net and working backwards to the weights nearest to the inputs of the network Net. The weights can be adjusted in dependence on the total loss of the network Net and/or similarities or distances between any of the embeddings output from the network Net. The weights $W_i$ of the network Net can be adjusted using known techniques for performing back propagation. Typically, if the network Net implements, for example, a sigmoid feed-forward function, then the back propagation is also performed using the same sigmoid function. Other examples of functions used for feed-forward and back propagation include gradient descent and stochastic gradient descent. Additionally, the learning rate for the back propagation can be set to a predetermined value and/or can be adjusted while training the network Net based on any other factors. This can be done over and over again using the same training data until satisfactory results (e.g., the calculated losses are minimal based on some type of predetermined threshold) are achieved.

In contrast to the architecture illustrated in FIG. 2, which utilizes a distance function, the modified triplet network 1000 illustrated in FIG. 10 utilizes a similarity function. The similarity function, which is used to determine a measure of similarity, can be any function having kernel properties, such as but not limited to a dot product function, a linear function, a polynomial function, a Gaussian function, an exponential function, a Laplacian function, an analysis of variants (ANOVA) function, a hyperbolic tangent function, a rational quadratic function, a multiquadratic function, an inverse multiquadratic function, a circular function, a wave function, a power function, a log function, a spline function, a B-spline function, a Bessel function, a Cauchy function, a chi-square function, a histogram intersection function, a generalized histogram intersection function, a generalized T-student function, a Bayesian function and a wavelet function.

In the above-described context, using similarity functions, as opposed to using distance functions, is better because neural networks are often trained with regularizers that, for example penalize and/or adjust for larger weights $W_i$. This adds an ever increasing cost in order to reach the training objective as the weights of the neural network get larger. These regularizers are added to prevent overfitting, where the network pays undue attention to details in the training data, instead of identifying broad trends. Further, these regularizers may be viewed as applying pressure toward a default behavior, which must be overcome by the training data. When used for learning embeddings, standard regularizers have an effect of pushing the embeddings toward an origin, which tends to push them closer together. If one uses a goal to achieve large distances when items are dissimilar, then this sort of regularization pushes towards a default that items will be similar. However, if a goal is set to have the embeddings have a large dot product when the items are similar (as in the case of the above-describe similarity function), then the regularizer applies pressure towards a default that items are dissimilar. It will often be the case that a typical random pair of items should be regarded as dissimilar. This results in an overall more accurate and efficient visual product discovery for a customer.

K-Net Network Architecture

Figure 11:
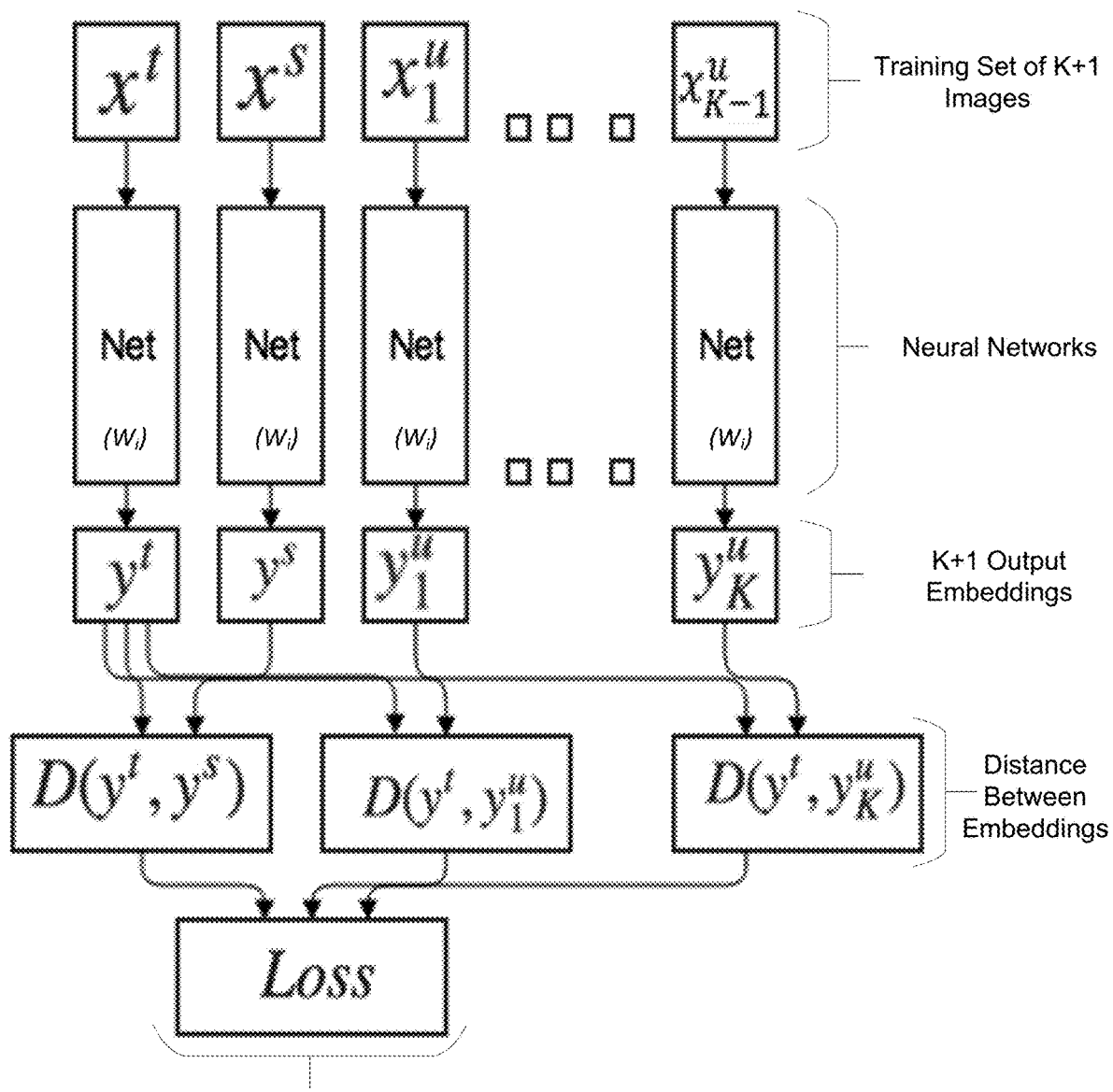
FIG. 11 illustrates a modified triplet network structure that utilizes a K-Net network architecture, according to an embodiment of the present invention.

FIG. 11 illustrates a modified triplet network structure that utilizes a K-Net network architecture, according to an embodiment of the present invention.

Referring to FIG. 11, a modified triplet network 1100 is illustrated, where a set of K+2 images is fed into a K-Net network, K being an integer greater than 1. This set of K+2 images can be used as training data to train the K-Net network.

In an implementation, the set of K+2 images can be defined as $\{x^t, x^s, x_i^u, \ldots, x_K^u\}$, where $x_i^u, \ldots, x_K^u$ represent a set of K images (i.e., the "K" portion of the set of K+2) for i=1 to K and K>1. Further, $x^t$ (e.g., a target image or document) and $x^s$ (e.g., a favored image or document) represents the "+2" portion of the set of K+2 images. Accordingly, the set of images feed into the K-Net network can be represented as $\{x^t, x^s, x_1^u, \ldots, x_K^u\}$, where $x^t$ is a target image or document, $x^s$ is a selected (favored) image or document and $x_1^u, \ldots, x_K^u$ are unselected images of the set of K+2 images. Because K>1, there must be at least four images or documents as part of the training set. An alternative implementation could involve the use of only three images or documents in the training set, which would include $x^t, x^s, x_K^u$, where K=1. However, this may not be the optimal implementation, because it is essentially the triplet approach described with reference to FIG. 2.

The set of K+2 images can be obtained by displaying the target image $x^t$ along with a screen of K+1 images to a user or a probability model, such as an oracle, that simulates the user. The K+1 images can be randomly selected or preselected based on any type of criteria and the behavior of the oracle can be based on a probability model. The user or the oracle then selects an image from the screen of K+1 images that is most similar to the target image $x^t$. The image selected by the user or the oracle is the selected image $x^s$. The remaining unselected images from the screen of K+1 images are identified as $x_i^u$ for i=1 to K (equally represented as $x_1^i, \ldots, x_K^u$).

As an outcome of the above-described process of determining the set of K+2 images, the set $\{x^t, x^s, x_1^u, \ldots, x_{K-1}^u\}$ of K+2 images is obtained. This set $\{x^t, x^s, x_1^u, \ldots, x_K^u\}$ of images is then and fed into and propagated through the K-Net network. Each image of the set $\{x^t, x^s, x_1^u, \ldots, x_K^u\}$ of K+2 images is composed of many pixels. Referring to the example above, each image could include 64 individual pixels, each having an RGB value. Therefore, for example, 196 pixel values representing image $x^t$, are input into 196 different input nodes (neurons) of the neural network Net. For the sake of illustration, each of the 196 nodes (neurons) is not represented in FIG. 5. The same holds for each image of the set. A benefit of feeding the set $\{x^t, x^s, x_1^u, \ldots, x_K^u\}$ images into K-Net network architecture illustrated in FIG. 11 is that when combined with an appropriate objective function the K-Net network preserves information regarding conditional probabilities of user choices, whereas the triplet approach, as illustrated in FIG. 2, utilizes the similarity function that only preserves ordinal relationships for pairs of images. In other words, the K-net network can compute the conditional probability, for each of the candidate images, that a user would consider them the most similar to a target image given the set of candidate images. This concept is described in greater detail below.

Referring to FIG. 11, when the set of K+1 images $\{x^t, x^s, x_1^u, \ldots, x_K^u\}$ is fed into the K-Net network, the set $\{x^t, x^s, x_1^u, \ldots, x_K^u\}$ of images is propagated through the neural network Net with shared weights $W_i$ to obtain a set of corresponding embeddings (e.g., vectors or matrices) $\{y^t, y^s,$ and $y_i^u, \ldots, y_K^u\}$, where $y^t=\text{Net}(x^t)$, $y^s=\text{Net}(x^s)$, and $y_i^u=\text{Net}(x_i^u)$. The obtained set of corresponding embeddings may also be identified as $\{y^t, y^s,$ and $y_1^u, \ldots, y_K^u\}$. The dimensionality of the vectors or matrices output from the neural network Net will depend upon architecture of the neural network Net. For example, a vector output from the neural network Net could have 128 dimensions as a result of the input image having any number of pixels. The example discussed above was with respect to an 8-by-8 pixel having a total of 64 pixels and a total of 196 inputs to the neural network Net. Another example would include a 256-by-256 pixel image having a total of 65,536 pixels and a total of 196,608 inputs to the neural network Net. Additionally, the smaller the dimensionality of the output vector (e.g., 128 dimensions) the easier the output vectors are to use (e.g., compute the distance between the two vectors). However, if the number of dimensions of the output vector is too small, then it will become harder for the neural network Net to capture the complexity of the images in the embedding.

Further, a distance function can be applied to the obtained embeddings to calculate a distance between a target embedding $y^t$ and a selected embedding $y^s$ and to calculate distances between the target embedding $y^t$ and each of the remaining embeddings $y_1^u, \ldots, y_K^u$. These distances can be calculated using any of the method described above or any other distance that would be apparent to a person of ordinary skill in the art. A result of this application of the distance function is a set of K pairwise distance measurements, which can be further propagated to a loss function, such as, for example loss $L=\log(1+\Sigma_{i=1}^{K} e^{D(y^t,y^s)-D(y^t,y_i^u)})$. This loss function can be interpreted as the log-likelihood of a probability model for predicting the probability that the image $x^s$ will be clicked on, given that $x^t$ is the target. Other known loss functions, or variations thereof, can be adapted to this particular implementation of the K-Net Architecture, such as mean-squared error, cross-entropy function, etc. Further, the loss function can be summarized or abbreviated as an average over all of the output vectors $y_i^u$ of $[D(y^t, y^s)-D(y^t, y_i^u)]$, where D is a distance between two vectors. The loss L gets smaller as $x^s$ gets closer to $x^t$ and the loss gets larger for some other $x^u$ as $x^u$ is further away from $x^t$. For this type of model it is convenient to apply Bayes' rule to derive probabilities that various products (images) are the targets, given past clicks of the user. When training the K-Net network, it is possible to obtain a choice of parameters that provide an accurate model. The K-Net network can be trained by propagating back errors (i.e., the loss) of this objective function, otherwise known as back propagation. This way, the weights of the neural network Net can be continually adjusted based on the loss L. In other words, the back propagation repeatedly adjusts parameters of the neural network until a sum of differences calculated from (i) a distance between the vector $y^t$ and the vector $y^s$ and (ii) distances between the vector $y^t$ and each of the vectors $y_i^u$ satisfies a predetermined criteria, wherein the sum of differences corresponds to a likelihood that a favored (selected) document will be selected over the unfavored (unselected) documents.

Specifically, the back propagation adjusts the weights $W_i$ of the network Net starting with the weights nearest to the outputs of the network Net and working backwards to the weights nearest to the inputs of the network Net. The weights can be adjusted in dependence on the total loss of the network Net and/or distances between any of the embeddings output from the network Net. The weights $W_i$ of the network Net can be adjusted using known techniques for performing back propagation. Typically, if the network Net implements, for example, a sigmoid feed-forward function, then the back propagation is also performed using the same sigmoid function. Other examples of functions used for feed-forward and back propagation include gradient descent and stochastic gradient descent. Additionally, the learning rate for the back propagation can be set to a predetermined value and/or can be adjusted while training the network Net based on any other factors. This back propagation can be done over and over again using the same training data until satisfactory results (e.g., the calculated losses are minimal based on some type of predetermined threshold) are achieved For the reasons described above, this K-Net Architecture not only takes into account the image selected by the user, but also takes into account all of the other images that were presented on the screen and not selected by the user. For example, when users are actually looking for something (e.g., clicking on an image) the desire of the user cannot be accurately reflected when only triplets are considered. This is because the triplets merely provide a result that indicates this one image of the triplet is closer to the target image than the other image of the triplet. In contract, using the K-Net Architecture, an entire screen of images is taken into account when training the neural network.

Furthermore, for example, when a first user is shown a target image and a screen of 10 images, the first user will pick one particular image. However, when a second user is shown the same target image and screen of 10 images, the second user may pick a different image and so on and so on. Even though each user might have different results, the training data and the K-Net Architecture makes it possible to superimpose all of the results by preserving data for the selected images and the unselected images for each user and then training the neural network using this preserved data. This can make it possible to calculate a probability, for each image on the screen that the user will select that image as being the most similar to the target, because the calculated loss L for each image is actually the probability of a user clicking on that image on the screen. Such results cannot be achieved using the above-described triplet architecture.

In another implementation, the K+2 set could be unrolled to K sets of triplets, such as $(x^t, x^s, x_1^u), \ldots, (x^t, x^s, x_K^u)$. The resulting sets of triplets can be used to find a distance or similarity function by training the triplet network structures illustrated in FIGS. 2 and 10.

In an embodiment, there are K+2 copies of a neural network, such that a single copy of the neural network is associated with an image x (e.g., neural network t is associated with image $x^t$, neural network s is associated with image $x^s$, and so forth). The weights $W_i$ are adjusted differently for each neural network by back propagation, as described above. This can result in each neural network being pulled in a different direction. By summing these changes, the system at large is modified to improve the overall loss.

Better than Random Regularization

Training deep neural networks is a challenging task and for successful results large amounts of data are necessary. As mentioned above, the architectures illustrated in FIGS. 2, 10 and 11 are even more challenging to train because (i) the number of triplets that can be used for training when there are N images in the training data is $N^3$ and (ii) typically the images from the training data are unlabeled (e.g., not classified).

Regarding the challenge of dealing with $N^3$ sets of triplets, for large sets of training data this is far too many triplets. Accordingly, smaller subsets of data must be obtained from the training data in order to efficiently train the neural networks. One method of obtaining smaller subsets of data from the training data is to randomly select images to be included in each of the triplets. However, this can cause a problem in that the randomly selected images are not close enough (e.g., in the same neighborhood) such that small differences between very similar images cannot be used for training the neural network. This results in the neural network being able to capture broad differences but not subtle differences between more similar images. The goal here is for the neural network to be able to compute embeddings so that the most similar embeddings are the most similar items (e.g., products).

Regarding the challenge of dealing with unlabeled training data, note that without having labeled images in the training data, it is difficult to identify images that are in a same or similar class, resulting in using triplets for training that use images that are far too different. Note that if the images from the training data are labeled, then it is easier to identify an image from the same "neighborhood" of classification. As a result, triplets can be sampled from labeled training data, such that such that image x and image $x^+$ belong to same class and image $x^-$ is randomly chosen from another class. However, typically this is not the case because labeled training data is generally not available. Again, because of this challenge of not having labeled training data, the result is that the neural network does not learn how to compare similar items.

Figure 12:
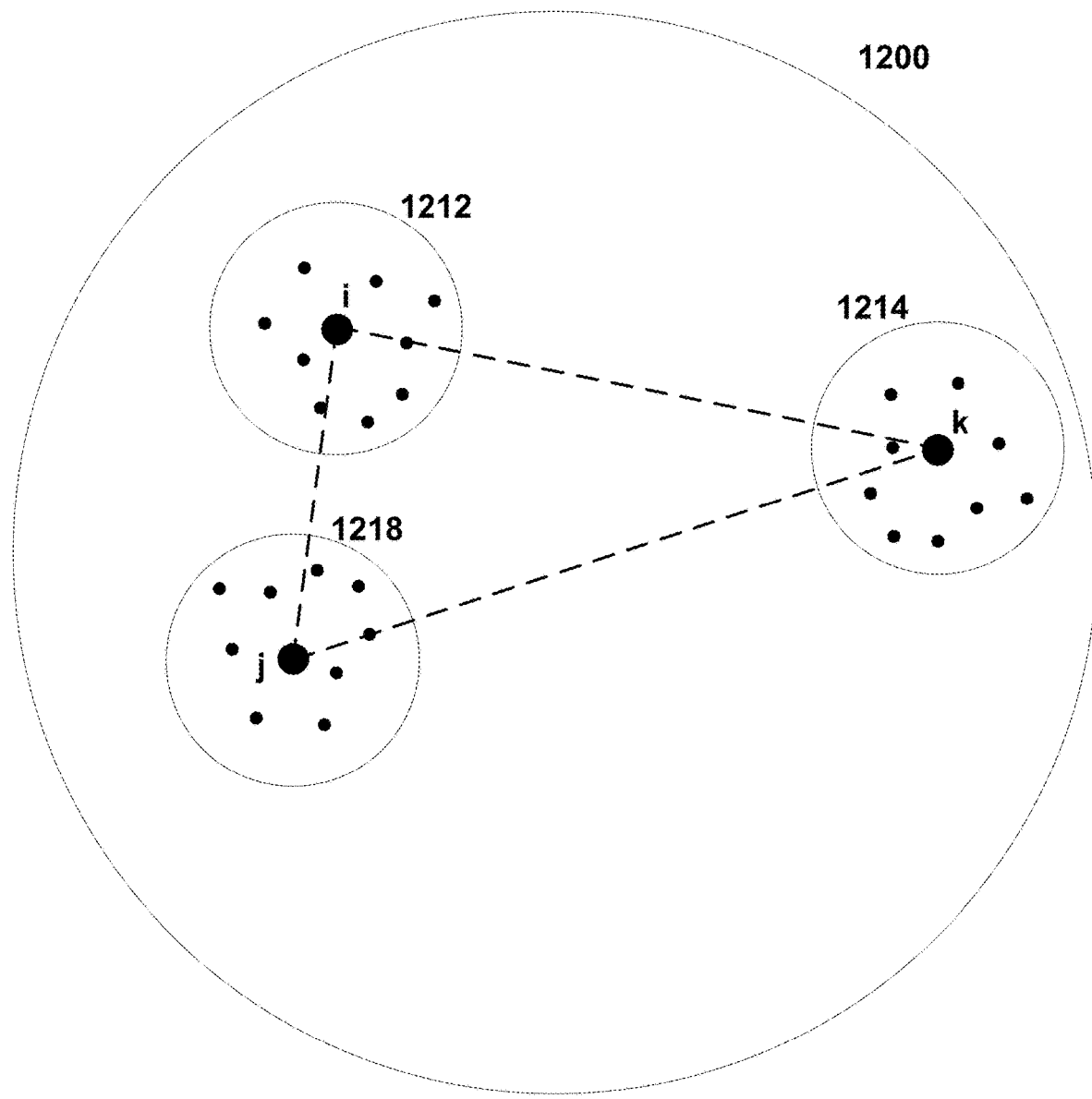
FIG. 12 illustrates a random triplet of images "i," "j" and "k", according to an embodiment of the present invention.

These problems are illustrated in FIG. 12 in which a random set of triplets is selected from a large catalog of unlabeled training data. With respect to selecting triplets of images from training data, there is an assumption that if the images are randomly sampled from a catalog, each of the images will be far from each other. One pair of images with certainly be closer to each other than another pair of images. However, it is likely that each of the images will not even be in the same neighborhood. Referring to FIG. 12, a catalog 1200 is illustrated, wherein three image triplets "i," "j" and "k" are randomly selected. As illustrated image "i" is much closer to image "j" than to image "k." It is clear that image "k" is the outlier. However, images "j" and "k" are not even in the same neighborhood 1212 as image "i." The same goes for the neighborhood 1214 of image "k" and the neighborhood 1218 of image "j." An effective way to address this issue of obtaining subsets of data that are more useful (i.e., in the same neighborhood) is to use better than random regularization, which is discussed in more detail below.

Better than random regularization chooses two random images, x and y for a triplet. The third component of the triplet is $\tilde{x}$, such that the triplet is represented by $(x, \tilde{x}, y)$. The third component $\tilde{x}$ is a noisy or perturbed version of the original image x. In an implementation, the noise or perturbation applied to x is not so drastic that the altered version of image x is unrecognizable to the neural network. In some implementations image $\tilde{x}$ might be a rotated version of the original image or might the same original image with an altered background. The purpose of creating image $\tilde{x}$ to train the neural network is so that the neural network is stable to an altered version of the same image. The noisy or perturbed version $\bar{x}$ of the same image x must always be closer to the original image x than the other random image. Applying the noise or perturbation to image x in various different manners enables the generation of a set of much larger training data that will compensate for the overfitting issues described above. In an implementation, while training a neural network, a batch of random sets of triplets can be augmented using far from random triplets $(x, \tilde{x}, y)$. These random triplets can be fed into various neural network architectures, such as the architectures illustrated in FIGS. 2 and 10, or even the architecture illustrated in FIG. 11.

Better than Random Unsupervised Learning

Another approach to addressing the above-described problem related to the generation of training data for triplet and K-Net type models is better than random unsupervised learning. As mentioned above, smaller sets of data must be identified from the training data if the training data is large and this can still result in inefficient training if the data (e.g., the images) is not labeled.

In order to address these above-described challenges, the better than random unsupervised learning approach of generating triplets on completely new sets of data can be used. This approach implements a model or a previously trained neural network that was trained using a different data set and then applying a new data set (e.g., training data) to that model/network in order to predict which items of the new data set are similar or dissimilar to each other. Once these initial similarities (or dissimilarities) are identified, then better triplets (e.g., more similar triplets) can be selected. Furthermore, once the training data has been ran through the model or neural network for identifying similarities, the better than random regularization approach can be implemented to perturb one of the images of the triplet. Alternatively, triplets generated from the new training data using the better than random regularization approach can be used to train a triplet model.

There are several advantages of this approach. First, an oracle or labeled data is not necessary to create the triplets, which will potentially save money. Second, a larger amount of training data can be generated. Third, once the model is trained, the model can be used to generate a next set of triplets. These triplets generated by the model will not be random anymore, because the model will learn some similarity measure. Accordingly, this better than random approach with unsupervised learning can be used to pick images for generating triplets from their local neighborhoods so as to increase an amount of valuable information per each training example.

Autoencoder Regularization in a Triplet Network

As discussed above the triplet and K-Net architectures are challenging to train due to overfitting. In other words, the goal is for the network to learn how to recognize shapes and attributes in a way that makes generalizations or generalizes to previously unseen items. In an implementation, an efficient way to regularize these networks is to include autoencoder type of regularization. The concept of autoencoding is to train the neural network to be able to encode an image x through forward propagation, then decode the encoded image using an inverse of the neural network to output, for example, image $\tilde{x}$. Then the original image x is compared to image $\tilde{x}$. Ideally the original image x will be similar to the decoded image $\tilde{x}$. The difference or loss between the two images can be used to further train the neural network to make the two images as similar as possible. This can be more complex than is sounds because the original image x is encoded into a low dimensional embedding by the neural network before being decoded. For example, a vector output from the neural network might have less dimensions than the original image x. As a result, when reconstructing the image from the encoded image (i.e., the vector output from the neural network) using the inverse neural network the resulting image might be different from the original image x. As such, the neural network must be properly trained so that the decoded image $\tilde{x}$ and the original image x are similar. In other words, even though there is a loss of dimensions from the original image x, it is still possible to determine whether or not the decoded image $\tilde{x}$ is similar to the original image x. This ensures that the neural network learns to capture the most important information of the original image in the embedding (or encoded image).

Figure 13:
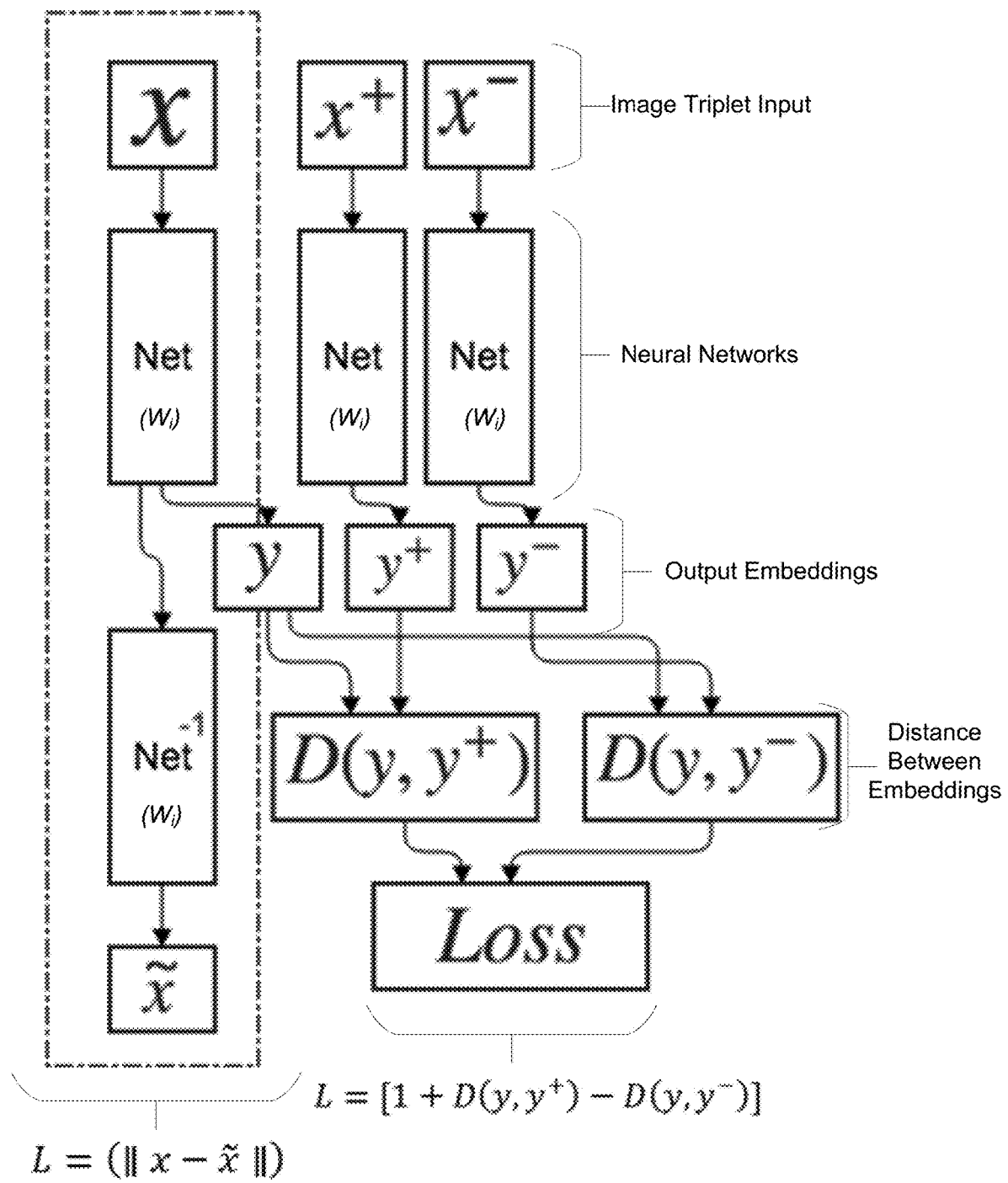
FIG. 13 illustrates an implementation of autoencoder regularization for training a neural network, according to an embodiment of the present invention.

The proposed architecture of autoencoder regularization in a triplet network is illustrated in FIG. 13, where the architecture is similar to the triplet architecture illustrated in FIGS. 2 and 11. FIG. 13 illustrates an implementation of autoencoder regularization for training a neural network, according to an embodiment of the present invention.

Referring to FIG. 13, an implementation of autoencoder regularization in a triplet network 1300 is illustrated, where, similar to FIG. 2, an input of the triplet network 1300 is an image triplet $(x, x^+, x^-)$. After forward propagation through neural network Net with shared weights $W_i$ an embedding (e.g., a vector or matrix representation) $y, y^+, y^-$ can be obtained and then a distance between embeddings $y^+$=Net$(x^+)$ and $y^-$=Net$(x^-)$ and the reference $y$=Net$(x)$ can be calculated. Referring to FIG. 13, the distance between embeddings $y$ and $y^+$ is identified as $D(y, y^+)$ and the distance between embeddings $y$ and $y^-$ is identified as $D(y, y^-)$. After calculating the distances between the embeddings, a loss L (or error) can be calculated as L=$[1+D(y, y^+)-D(y, y^-)]$. As the loss L becomes closer to zero, the lower the error. The weights $W_i$ of the neural network Net can be trained using back propagation, as described above.

The main difference between the architectures illustrated in FIGS. 2 and 11 and the architecture illustrated in FIG. 13 is that the output embedding (vector or matrix) $y$=Net$(x)$ is propagated to a decoder type network Net$^{-1}$ which produces image $\tilde{x}$, which is a reconstruction of image x. A loss between image x and image $\tilde{x}$ can be calculated as L=$(\|x-\tilde{x}\|)$. Based on the calculated loss between image x and image $\tilde{x}$, the weights of the neural network Net can be adjusted using back propagation, as described above, so that image x and image $\tilde{x}$ essentially match or come closer to matching. Again, through this process the autoencoder is trained through back propagation, as described above, to reconstruct the original image x as closely as possible.

Training Data Generation

Figure 14:
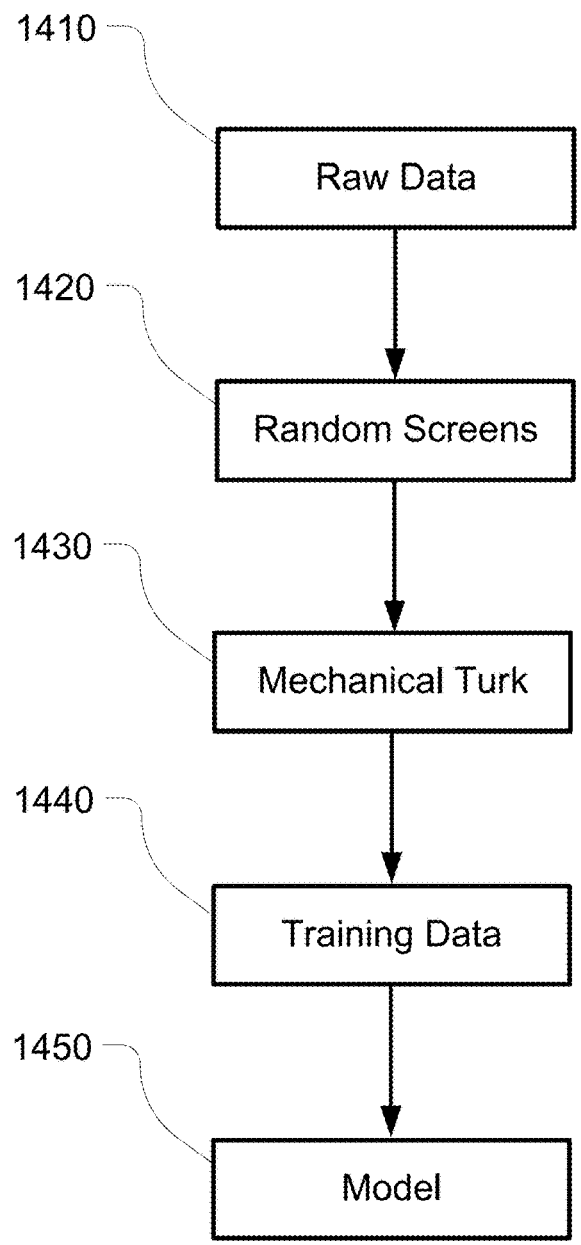
FIG. 14 illustrates a flowchart describing a generation of random training data for a neural network.

FIG. 14 illustrates a flowchart describing a generation of random training data for a neural network. One of the most important aspects of training a model is acquiring appropriate training data and test data.

Referring to FIG. 14, a flowchart 1400 describing a generation of random training data for a neural network is illustrated, where in operation 1410 raw data (e.g., unlabeled data with no distances or similarities associated therewith) is obtained and in operation 1420 random screens of N images are determined from the raw data.

Next, in operation 1430 a "Mechanical Turk" (hereinafter Turk or Mechanical Turk) such as an "Amazon® Mechanical Turk" (https://www.mturk.com/mturk/welcome) can be implemented to start the generation of the training data from the raw data. A Turk is a crowdsourced Internet marketplace enabling individuals and businesses to coordinate the use of human intelligence to perform tasks that computers are currently unable to do. Here, employers are able to post jobs known as Human Intelligence Tasks (HITs), such as choosing the best among several photographs of a storefront, writing product descriptions, or identifying performers on music CDs.

The Turk can be used to generate the initial training data by showing a person (Turker) a target image x and N other related images and asking the Turker to choose one image out of the N images that is closest to the target image x. The use of a Turk is considered supervised learning, because a person is involved in the process. Alternatively, an implementation can use unsupervised learning. Rather than using a person, an algorithm can be created that selects, from the N related images, the most similar image to the target image x. The algorithm determines which image is most similar through a distance measure, for instance, created using labels if available or the image embeddings computed from a previously trained neural network. Sometimes this "algorithm" is referred to as model or as general purpose model, which is described in more detail later on.

In operation 1440 the outcome of the process performed by the Turk can be arranged as training data for training the model. The training data obtained in operation 1440 is essentially a "screen" of data including the target image x, the selected image and the unselected images. This "screen" of data can be identified as {target, selected, unselected(1), unselected(2), . . . , unselected(N−1)}. This provides data that is ordered/organized in such a way that it is known that the distance between the target image and the selected image should be smaller than the distance between the target image and any unselected image.

In operation 1450 the training data is input into the neural network (e.g., model) that is being trained. In an implementation, the training data can be used to train a K-Net network or a triplet network as described above.

One disadvantage to the operations of the flowchart 1400 illustrated in FIG. 14 is the use of random screens and/or triplets, because the random screens and/or triplets contains less information than non-random screens and/or triplets that contain similar products. Another disadvantage is that random screens do not necessarily resemble a distribution of "real data." FIGS. 15-17, discussed below describe improved methods for obtaining and developing training data, in comparison to the operations illustrated in FIG. 14.

Regarding "real data," one of the most challenging aspects of generating training data is that the training data should resemble an underlying distribution of "real data." In an implementation "real data" is data that represents what a user would select (e.g., which documents or images a user would select) when a user is presented with documents or images on a screen.

Figure 15:
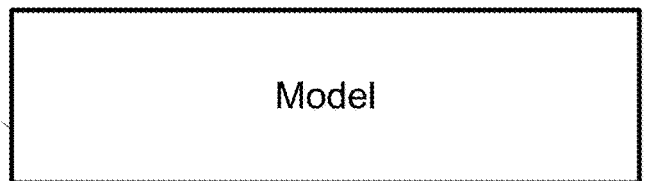
FIG. 15 illustrates a flowchart describing an overall process of providing a service using a trained model.
Figure 15:
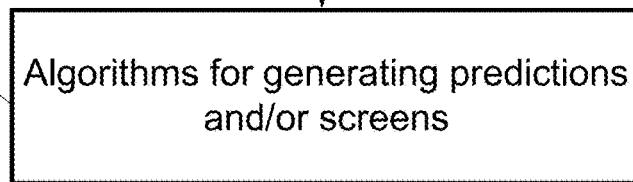
Figure 15:

FIG. 15 illustrates a flowchart describing an overall process of providing a service using a trained model.

Referring to FIG. 15, a flowchart 1500 describing an overall process of providing a service using a trained model is illustrated, where a trained model 1510 uses algorithms for generating predictions and/or screens 1520 to provide a service 1530 to the customer in the form of images and/or screens that are believed to draw the customer to their target image (e.g., an image in their mind that they are trying to reach, such as a specific product). The images and/or screens that are provided to the customer are based on the algorithms for generating predictions and/or screens 1520, which uses embeddings produced by the model 1510. The outcome of the service 1530 is only as good as the trained model 1510. As discussed above, the use of better or more comprehensive training data allows for the creation of a better (e.g., more accurate or realistic) model, because the model is only as "smart" as the data that was used for training. This is why it is important to improve the above-described training data generating process. When generating training data, there are two important aspects, (i) generating training data for a new domain (e.g., a set of images for which a model has not been developed), and (ii) generating training data for an existing domain (e.g., a set of images for which a model has been developed), where there might be a new customer or new set of products for the existing domain for which the model based on the existing domain needs to be or should be further trained.

Figure 16:
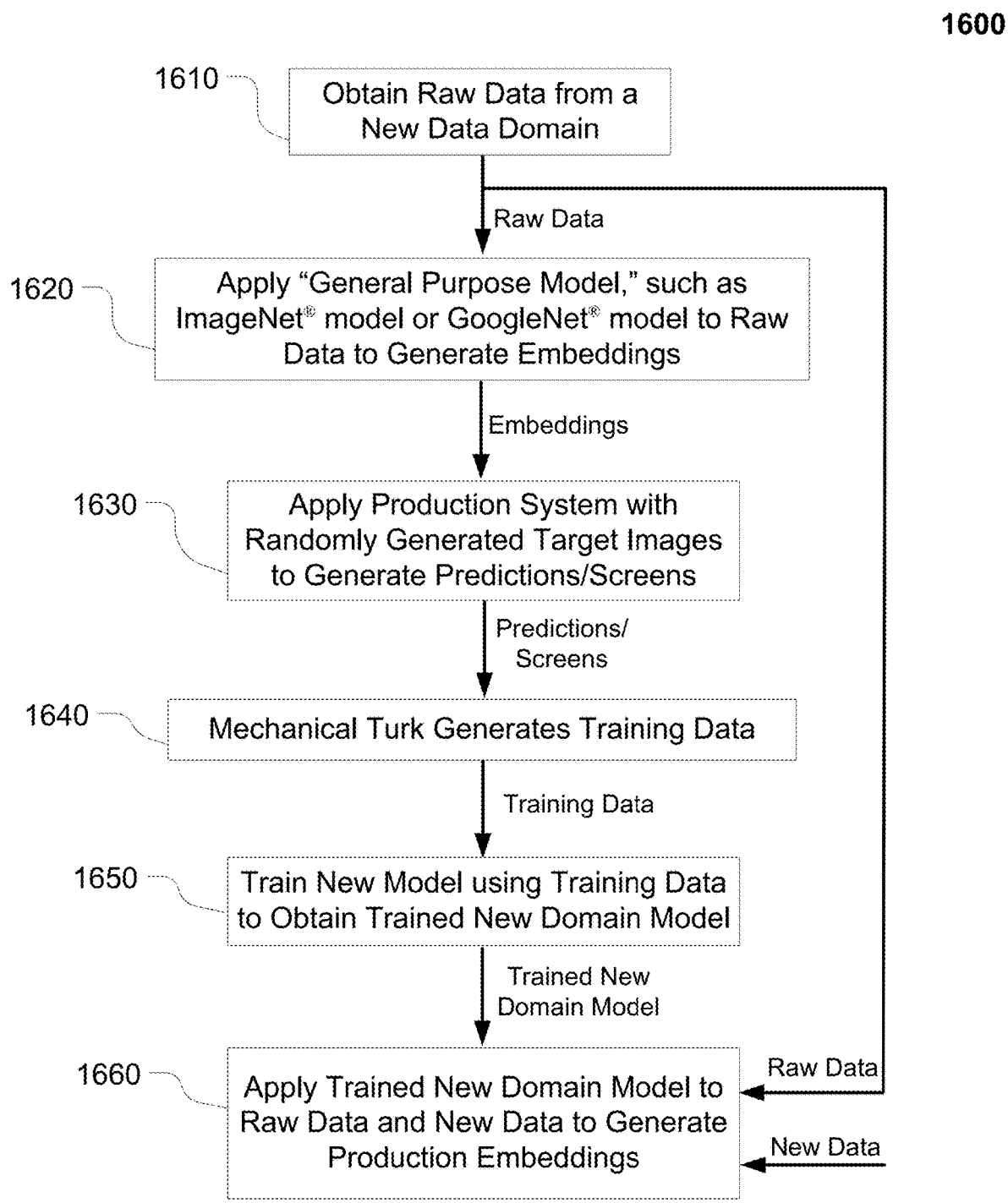
FIG. 16 illustrates a flowchart describing a generation of training data for a neural network for a new data domain and the creation of production embeddings or a production embedding space, according to an embodiment of the present invention.

FIG. 16 illustrates a flowchart describing a generation of training data for a new data domain (e.g., a set of images for which a model has not been developed) and the creation of production embeddings or a production embedding space, according to an embodiment of the present invention.

Referring to FIG. 16, a flowchart 1600 describing a generation of training data for a new data domain is illustrated, where a general purpose model is used to create embeddings that generate smarter or more relevant inputs for the Mechanical Turk. This provides the Mechanical Turk with a better starting point, rather than just using randomly selected images.

As illustrated in FIG. 16, in operation 1610 raw data (e.g., images or documents) are obtained from the new data domain. The images or documents are raw data in the sense that there is no information regarding a measure of dissimilarity or collective closeness between the images or documents, even though the images or documents could be related to a particular catalog (e.g., apparel, vehicles, etc.). Again, this is a new data domain, meaning that the model that is eventually going to be trained using this data has not been previously trained in this particular data domain. For example, the model may have previously been trained on athletic shoes, but not formal shoes.

In operation 1620 the raw data is fed into a general purpose model. This general purpose model can be, for example, a previously generated and publicly available model, such as an ImageNet Model® generated from images stored on ImageNet® or a GoogleNet® model generated from images stored on Google®. Rather than applying the general purpose model to the raw data, variational autoencoding (VAE), which is described in more detail below can be applied to the raw data to obtain embeddings. This approach of using the VAE has the advantage of generating embeddings from a network trained on this specific dataset, which could provide a better initial encoding of the images as opposed to using the general purpose model.

As a result of operation 1620, embeddings (e.g., vectors that can be interpreted as coordinates in an embedding space) can be obtained from the output of the general purpose model. The embeddings can be, for example, a vectors obtained from a triplet network, a K-Net Network, etc., as discussed above. These vectors can be 128-bit vectors resulting from neural network processing, as discussed above.

Operation 1630 is performed in order to generate or identify screens or groups of images to be presented at a later point, to a Mechanical Turk, for example. A goal of this operation is to generate/identify the screens/groups of images so that the screens/groups include a realistic distribution of images (e.g., a realistic distribution of distances between embeddings) with respect to a randomly selected target image. In operation 1630 the (non-production) embeddings (e.g., non-production vectors representing coordinates in an embedding space) that are obtained from the general purpose model are presented to a production system and the production system utilizes randomly generated target images to generate screens (e.g., a group or groups) of images. In other words, certain documents from the non-production embeddings are identified as document predictions (e.g., a screen of images). This group of documents can be represented as intermediary vectors that are obtained from the non-production embeddings identified in operation 1620, where the intermediary (documents) vectors are identified by the algorithms of the production system based on the randomly generated target images. In this operation, algorithms for generating the predictions of images and/or screens of images are applied to the embeddings generated from the general purpose model. In other words, the embeddings representing the images are fed into the production system so that the production system can apply algorithms and identify embeddings that represent a realistic distribution of images with respect to the randomly selected target image. The embeddings identified from this process are image vectors representing N images that are predicted to most closely resemble (e.g., lowest dissimilarity) a target image.

In other words, this operation can be implemented to simulate users looking for different images. For each randomly generated target image, the production system alternatively generates a screen (based on previous simulated clicks if any) and predicts which item would be clicked on. An initial screen presents items that are far apart from each other. But as the production system continues to simulate clicks toward a specific target, items presented in the screens get closer and closer to each other. The algorithm stops when the target item is found, or after an arbitrary maximum number of simulated clicks is reached.

These algorithms applied to the embeddings in operation 1630 can be the same as or similar to algorithms that are or will be applied to "live" data once the model has been trained. For example, the algorithms may be the same algorithms that, in production service, provide a screen to a potential customer, where the customer clicks on an image or product that is the closest to an imaginary target product that the customer is trying to find. However, rather than using an actual customer (e.g., supervised learning) at this point, the role of the customer is performed using the embeddings and an embedding model and the algorithms (e.g., unsupervised learning).

In operation 1640, the predictions and/or screens of N images obtained in operation 1630 along with the target images are provided to a Mechanical Turk. Operations 1610, 1620 and 1630 essentially provide the Mechanical Turk with a better starting point than just randomly choosing a screen of images for the Mechanical Turk to examine and provide a result, as illustrated in FIG. 14. As a result of operation 1640, new training data is obtained from the Mechanical Turk. The new training data obtained from the Mechanical Turk can include the target image (or a representation thereof, such as a vector), the image (or representation thereof) selected by the Mechanical Turk and the predicted images (or representations thereof) that were provided to the Mechanical Turk but not selected by the Mechanical Turk. In other words, as described above with reference to FIG. 14, the new training data obtained in operation 1640 is essentially a "screen" or group of data including representations of a target image x, the selected image and the unselected images. This "screen" or group of data can simply be identified as {target, selected, unselected(1), unselected(2), . . . , unselected(N−1)}. Other implementations could include multiple target images and/or multiple selected images being identified and utilized as the "screen" of data.

Then, in operation 1650 the new training data obtained from the Mechanical Turk is used to train a new model in order to eventually obtain a "trained new domain model." The new training data is input into the new model that is being trained. In an implementation, the new training data can be used to train the new model in a K-Net network as described above and can also be used to create triplets, such as {target, selected, unselected(1)}, {target, selected, unselected(2)}, . . . , {target, selected, unselected(N−1)}, for training the new model using a triplet network, as described above. Once this training is complete, the "trained new domain model" is available.

After the new model is trained to obtain the "trained new domain model," in operation 1650, the raw data and/or new data can be fed into the "trained new domain model" so that the "new trained domain model" can generate production embeddings in operation 1660. The generated production embeddings are used to choose products as explained in the above-described references incorporated herein.

Figure 17:
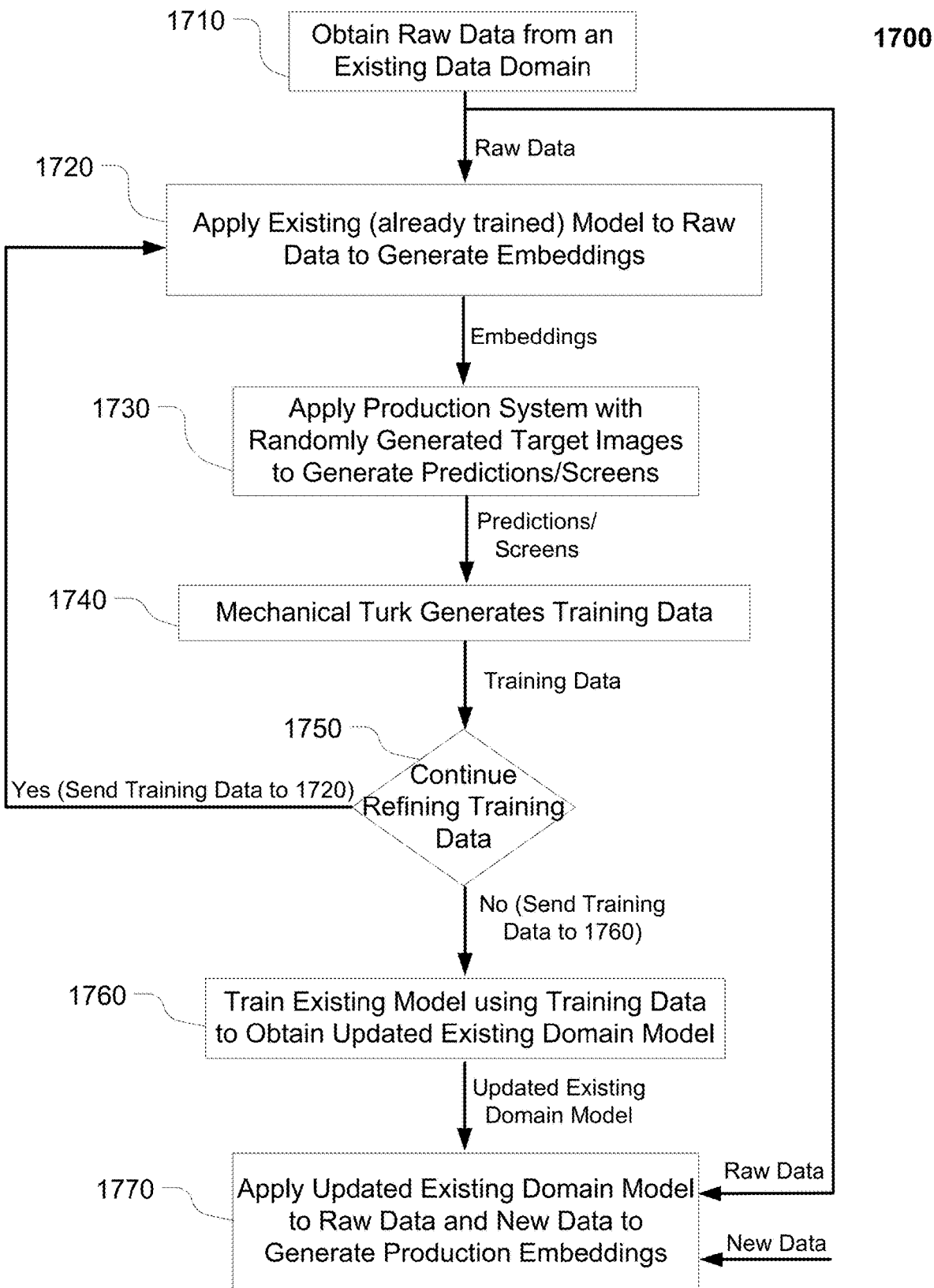
FIG. 17 illustrates a flowchart describing a generation of training data for a neural network for an existing data domain, according to an embodiment of the present invention.

FIG. 17 illustrates a flowchart describing a generation of training data for an existing data domain (e.g., generating a set of new images for a specific domain for a model that has already been trained), according to an embodiment of the present disclosure. An example implementation is a situation where there might be a new customer or new set of products for an existing domain for which the (already trained) model needs to be or should be further trained.

Referring to FIG. 17, a flowchart 1700 describing a generation of training data for an existing data domain is illustrated, where an existing domain model is used to create embeddings that are then used to generate smarter or more relevant inputs for the Mechanical Turk. This provides the Mechanical Turk with a better starting point, rather than just using randomly selected images.

As illustrated in FIG. 17, in operation 1710 raw data (e.g., images or documents) are obtained from an existing data domain. The images or documents are raw data in the sense that there is no information regarding a measure of dissimilarity or collective closeness between the images or documents, even though the images or documents could be related to a particular catalog (e.g., apparel, vehicles, etc.). Again, this is an existing data domain, meaning that the model has already been trained on data from this data domain. For example, the model may have previously been trained on athletic shoes using a first set of images or documents, but not using a second set of images or documents (e.g., the second set of images or documents could simply be an updated set of images or documents that represent a new line of products for an upcoming year).

In operation 1720 the raw data is fed into the existing (e.g., previously trained) model. This existing model can, for example, be a model that has been previously used to create a production embedding or simply GoogleNet®. As a result of operation 1720, embeddings (e.g., vectors that can be used to form an embedding space) can be obtained from the output of the existing model. Rather than applying the general purpose model to the raw data, variational autoencoding (VAE), which is described in more detail below, can be applied to the raw data to obtain embeddings. This approach of using the VAE has an advantage of generating embeddings from a network trained on this specific dataset, which might result in a better initial encoding of the images.

The embeddings can be, for example, a vectors obtained from a triplet network, a K-Net Network, etc., as discussed above. These vectors can be 128-bit vectors resulting from neural network processing, as discussed above.

The difference between operation 1720 and operation 1620 is that in operation 1720, the model has already been trained for the particular domain from which the raw data is obtained. The output of the model can be considered non-production embeddings that are represented as non-production vectors.

Operation 1730 is performed in order to generate or identify screens or groups of images to be presented at a later point to a Mechanical Turk, for example. A goal of this operation is to generate/identify the screens/groups of images so that the screens/groups include a realistic distribution of images (e.g., a realistic distribution of distances between embeddings) with respect to a randomly selected target image. In operation 1730 the (non-production) embeddings (e.g., non-production vectors representing coordinates in an embedding space) that are obtained from the existing model are used in a production system and the production system utilizes randomly generated or selected target images to generate screens (e.g., a group or groups) of images. In other words, certain documents from the non-production embeddings are identified as document predictions (e.g., a screen of images). This group of documents can be represented as intermediary vectors that are obtained from the non-production embeddings identified in operation 1720, where the intermediary (documents) vectors are identified by the algorithms of the production system based on the randomly generated target images. In this operation, algorithms for generating the predictions of images and/or screens of images are applied to the embeddings generated from the general purpose model. In other words, the embeddings representing the images are fed into the production system so that the production system can apply algorithms and identify embeddings that represent a realistic distribution of images with respect to the randomly selected target image. The embeddings identified from this process are image vectors representing N images that are predicted to most closely resemble (e.g., lowest dissimilarity) a target image.

In other words, this operation can be implemented to simulate users looking for different images. For each randomly generated target image, the production system alternatively generates a screen (based on previous simulated clicks if any) and predicts which item would be clicked on. An initial screen presents items that are far apart from each other. But as the production system continues to simulate clicks toward a specific target, items presented in the screens get closer and closer to each other. The algorithm stops when the target item is found, or after an arbitrary maximum number of simulated clicks is reached.

These algorithms applied to the embeddings in operation 1730 can be the same as or similar to algorithms that are or will be applied to "live" data once the model has been trained. For example, the algorithms may be the same algorithms that, in production service, provide a screen to a potential customer, where the customer clicks on an image or product that is the closest to an imaginary target product that the customer is trying to find. However, rather than using an actual customer (e.g., supervised learning) at this point, the role of the customer is performed using the embeddings and an embedding model and the algorithms (e.g., unsupervised learning).

In operation 1740, the predictions of N images and/or screens of N images obtained in operation 1730 along with the target image are provided to a Mechanical Turk. Operations 1710, 1720 and 1730 essentially provide the Mechanical Turk with a better starting point than just randomly choosing a screen of images for the Mechanical Turk to examine and provide a result, as illustrated in FIG. 14. As a result of operation 1740, new training data is obtained from the Mechanical Turk. The new training data obtained from the Mechanical Turk can include the target image (or a representation thereof, such as a vector), the image (or representation thereof) selected by the Mechanical Turk and the predicted images (or representations thereof) that were provided to the Mechanical Turk but not selected by the Mechanical Turk. In other words, as described above with reference to FIG. 14, the new training data obtained in operation 1740 is essentially a "screen" or group of data including representation of a target image x, the selected image and the unselected images. This "screen" or group of data can simply be identified as {target, selected, unselected(1), unselected(2), . . . , unselected(N−1)}. Other implementations could include multiple target images and/or multiple selected images being identified and utilized as the "screen" of data.

Then, in operation 1750 a determination is made as to whether the new training data needs to be further refined and/or updated. This determination can be based on several factors, such as, for example, visual inspection of similarity judgments produced by the model and statistical evaluation of the model used in the context of the larger overall system.

If it is determined in operation 1750 that there is still a need to further refine and/or update the new training data, then the new training data is sent back to operation 1720 to further continue the above described operations 1720, 1730 and 1740 using the new training data (the new training data is processed in operation 1720 rather than the raw data). In other words, the new training data can be input back into the existing domain model utilized in operation 1720. Based on this structure, a feedback loop can be created such that the training data generated in operation 1740 can be used to further improve the existing domain model and further improve the new training data. This feedback loop can be repeated until the required model quality is achieved. In other words, a determination is made as to whether required model quality is achieved. This can be done before operation 1760, as illustrated in FIG. 17, or alternatively after operation 1760. Model quality can be achieved when the trained model outputs a satisfactory measure of similarity between products. A way of verifying this is to compute the embedding of every item of a catalog, and then sample a set of random items and display its nearest neighbors in the embedding space. If for each sampled item its nearest neighbors look very similar (e.g., a human can make this judgement), then it is an indication that the trained model is working as designed. If it is not working as designed, then the process returns to operation 1720.

Alternatively, this feedback loop can continue even after the production embeddings are generated in operation 1770. For example, trends and opinions of Mechanical Turks can change over time, based on how people are changing their perceptions. This continuous feedback can be useful for continuously updating the existing domain model.

If it is determined in operation 1750 that there is no need to further refine and/or update the training data, then in operation 1760 the new training data obtained from the Mechanical Turk is used to train the existing model in order to eventually obtain an "updated existing domain model." The new training data is input into the existing model that is being trained. In an implementation, the new training data can be used to train the existing model in a K-Net network as described above and can also be used to create triplets, such as {target, selected, unselected(1)}, {target, selected, unselected(2)}, . . . , {target, selected, unselected(N−1)}, for training the existing model using a triplet network, as described above. Once this training is complete, the "updated existing domain model" is available. In an implementation, rather than training an existing model in operation 1760, a new model can be trained.

After the existing model is trained to obtain the "updated existing domain model," in operation 1760, the raw data and/or new data can be fed into the "updated existing domain model" so that the "updated existing domain model" can generate production embeddings in operation 1770. The generated production embeddings are used as explained in the disclosures incorporated herein by reference.

Variational Autoencoding

As briefly mentioned above, gathering data (e.g., selections) from crowdsourced users is a typical way to start a collection of training data to be eventually fed into the neural network or model. This can be done many different ways. A good example is using a "Mechanical Turk" (hereinafter Turk or Mechanical Turk) such as an "Amazon® Mechanical Turk" (https://www.mturk.com/mturk/welcome), which can be implemented to start the generation of the training data from raw data. In order to speed up the collection of information (data) it would be helpful to generate screens of similar items to have an initial unsupervised embedding, as opposed to a random initial embedding.

For example, consider what would happen with a completely random initial embedding. Users searching for an item would be presented with a random screen with every click, never narrowing down (e.g., getting closer to a target item or image). While training data obtained using these methods would give some information, it would be very difficult for the model being trained to learn fine-grained distinctions between similar items or images (this problem is discussed in more detail above). As a result, one would need to train a model on the random screens, use that model to collect more training data, and loop that process until the model used to collect data was sufficiently fine-tuned enough for the users to accurately explore the space and find the target item or image. This process could take any number of iterations.

In contrast to suing a completely random initial embedding, a reasonable unsupervised initial embedding can be used. Such an initial embedding would allow user to, on the very first data collection effort, narrow in on their target item or item and find it. This allows data to be collected from all granularities, both at the high level between very different items or images and also at the low level, between items or images that appear similar. This approach eliminates various iterations of the loop of collecting data→refining the model→collecting data loop, which in turn provides a saving on costs and time.

Previously, as opposed to using a completely random embedding as a basis for developing training data, pre-trained image recognition models, which are widely accepted as giving strong recognition results, have been implemented. While these pre-trained image recognition models are not trained particularly to identify the types of items or images of interest, their general abstract shape recognition abilities tends to result in similar items being mapped to a similar point in embedding space. However, if the shapes in this data set are different than what the general purpose model is used to process, then the general purpose model might not be able to predict similar items accurately.

To solve these above-described problems, a variational autoencoder (VAE) is used to create the initial embedding Kingma et al., "Auto-Encoding Variational Bayes" (1 May 2014), incorporated herein by reference). In general, an autoencoder is a neural network that simply attempts to recreate its input, with the constraint that somewhere in the network, a bottleneck is introduced with less dimensions than the input itself. The autoencoder then must learn the most efficient way to represent the input (the encoder) through this bottleneck, such that it can reconstruct the input (the decoder) as closely as possible. The bottleneck is, for example, represented by some n-dimensional dense vector. The bottleneck itself can be treated as an embedding for the original input image.

Fundamentally, a VAE attempts to perform the same task as the general autoencoder, but it uses a twist. Rather than using some n-dimension dense vector as the bottleneck between the encoding and decoding parts of the network, the VAE tries to learn n probability distributions (generally Gaussians) with the encoder, and samples from those distributions to get a vector to pass to the decoder for reconstruction.

The VAE can be used to train a model in a completely unsupervised manner by attempting to encode documents/images into n-Gaussian distributions. The Gaussian distributions can then be used as initial embeddings, since documents/images that would have needed to be reconstructed similarly (and hence appear similar) would have been encoded with similar distributions. There are a number of options for measuring the distance between vectors of distributions, such as a simple Euclidean distance between the vectors comprised of the distributions' means (more reasonable in this case since the distributions' variances are encouraged to be similar by the loss function), or a Bhattacharyya distance. Other options will be apparent to a person of ordinary skill in the art. This approach appears to be as good or better than other approaches for generating the initial embedding from which training data is eventually obtained.

Figure 18:
FIG. 18 illustrates a visual interface that enables searching for shoes using a visual interactive search environment on a mobile device according to an implementation of the present disclosure.

Implementations of Production Embeddings for a Visual Interactive Search for Physical and/or Digital Products FIG. 18 illustrates a visual interface that enables searching for shoes using a visual interactive search environment on a mobile device according to an implementation of the production embedding, or any other embedding, developed or created as described within the present disclosure. In this implementation the catalog (e.g., the document catalog database 316 or 318, as illustrated in FIG. 3) is maintained and candidate results are identified on a server (e.g., the server computer 312, as illustrated in FIG. 3), while constraints applied to the production embedding can be maintained on a mobile device 1801.

In this example implementation, the shoes are embedded in a high dimensional space (e.g., the production embedding) by applying any of the neural networks described above and trained to capture the visual similarity between shoes. Other contributions can be made to the embedding using Kernels that compare meta-data about the shoe, e.g., its brand. The primary result 1802 is displayed prominently as a large image in the top left corner. The shoe 1803 that is closest to the primary result in the embedded space (i.e., is most similar) is displayed closest to the primary result. A discriminative set of results that satisfies the current constraints is then displayed. These constraints may be hard or soft constraints in different implementations, or some may be hard constraints and others soft constraints. Note that these results retain significant diversity, e.g., the shoe 1804 that is farthest in the embedding space (and displayed farthest from the primary result) is a different color, but the same brand as the primary result. This implementation maintains a stack of constraints. Each constraint requires the candidate to be closer to a user-selected image than one non-selected image. Thus at each iteration multiple constraints, e.g., 11, may be added. In one implementation, these constraints are treated as soft constraints in that each candidate suffers a penalty for each broken constraint. The candidate results are those with smaller penalties. In this implementation the stack of selected images is displayed at 1805 with the oldest user selection at the left and newer ones to the right. The user may click on any image in this stack. This will removed all images (and their associated constraints) to the right of the clicked image off the stack. This has the effect of taking the user back to a previous search state, defined by the set of constraints that were in effect before the clicked image was selected.

Computer System

Figure 19:
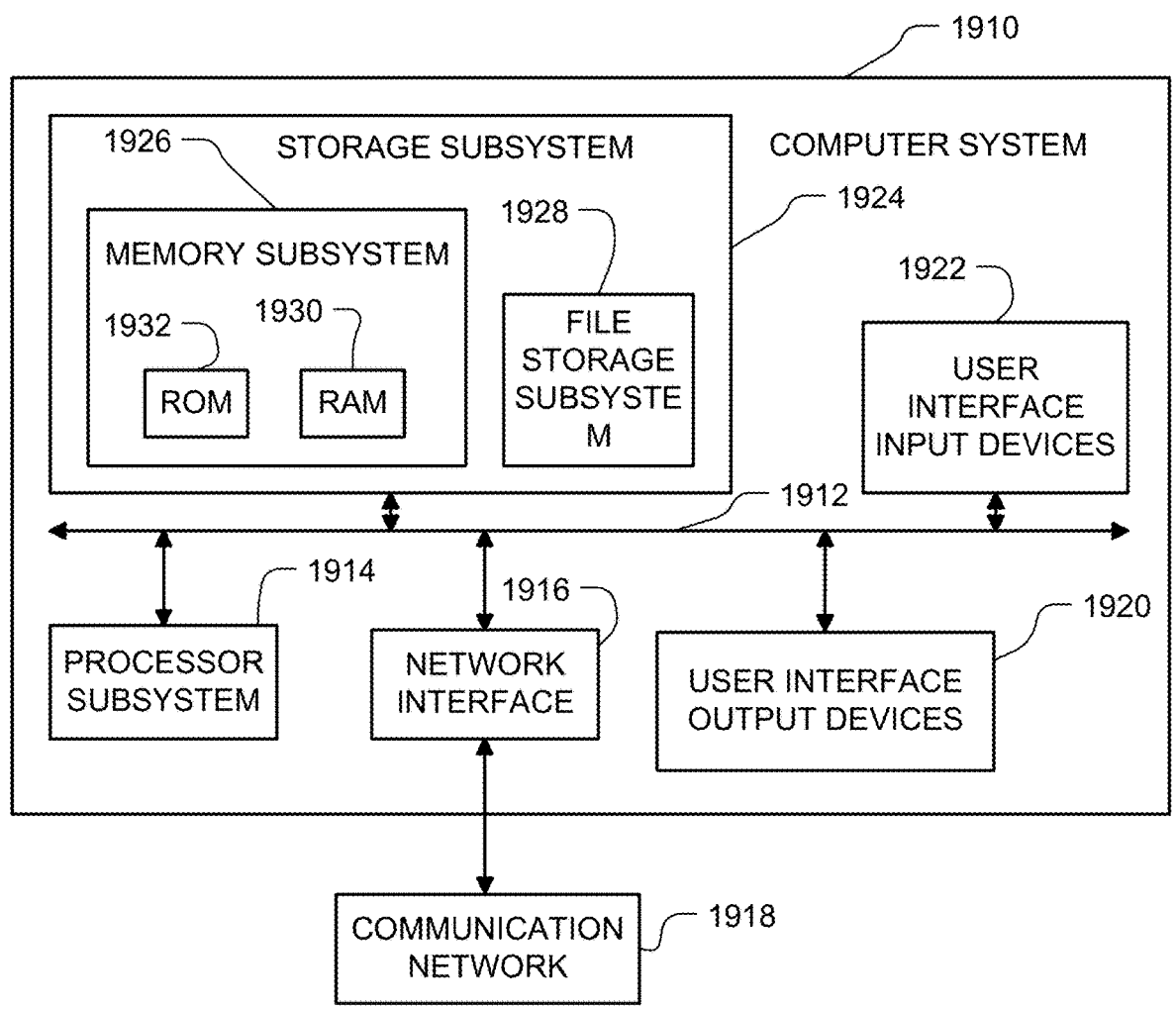
FIG. 19 is a block diagram of a server computer, as illustrated in FIG. 3, that can be used to implement software incorporating aspects of the content embedding according to an implementation of the present disclosure.

FIG. 19 is a block diagram of an example computer system, according to one implementation, that can used to implement software incorporating any of the above-described operations regarding content embedding and training data generation, etc. For example, the example computer system could be the server computer 312 or the user computer 310 or a combination thereof, as illustrated in FIG. 3. The processor can be an ASIC, CISC, or RISC processor. It can be an FPGA or other logic or gate array. It can include graphic processing unit (GPU) resources. Computer system 1910 typically includes at least one processor subsystem 1914 that communicates with a number of peripheral devices via bus subsystem 1912. These peripheral devices can include a storage subsystem 1924 including, for example, memory devices and a file storage subsystem 1928, user interface input devices 1922, user interface output devices 1920, and a network interface 1916. The input and output devices allow customer interaction with computer system 1910. Network interface 1916 provides an interface to outside networks, including an interface to corresponding interface devices in other computer systems.

The communication network 1918 may comprise many interconnected computer systems and communication links. These communication links may be wireline links, optical links, wireless links, or any other mechanisms for communication of information, but typically the communication network 1918 is an internet protocol (IP)-based communication network. While in one implementation, the communication network 1918 is the Internet, in other implementations, the communication network 1918 may be any suitable computer network.

Physical hardware components of network interfaces (e.g., the network interface 1916 and the communication network 1918) are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1922 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1910.

User interface output devices 1920 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1910 to the user or to another machine or computer system.

Storage subsystem 1924 stores programming and data constructs that provide the functionality of some or all of the modules and methods described herein. These software modules are generally executed by one processor subsystem 1914 alone or in combination with other processors.

Memory 1926 used in the storage subsystem can include a number of memories including a main random access memory (RAM) 1930 for storage of instructions and data during program execution and a read only memory (ROM) 1932 in which fixed instructions are stored. A file storage subsystem 1928 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1928 in the storage subsystem 1924, or in other machines accessible by the processor.

Bus subsystem 1912 provides a mechanism for letting the various components and subsystems of computer system 1910 communicate with each other as intended. Although bus subsystem 1912 is shown schematically as a single bus, alternative implementations of the bus subsystem can use multiple busses.

The computer system 1910 itself can be of varying types including a personal computer, a portable computer, a workstation, a computer terminal, a network computer, a television, a mainframe, a server farm, or any other data processing system or user device. In particular, it is envisaged that the computer system 1910 may be a hand-held device such as a tablet computer or a smart-phone. In another implementation, a "system" performs all the operations described herein, and the "system" can be implemented as a single computer or multiple computers with any desired allocation of operations among the different member computers. Due to the ever-changing nature of computers and networks, the description of the computer system 1910 depicted in FIG. 19 is intended only as a specific example for purposes of illustrating the preferred implementations of the present disclosure. Many other configurations of the computer system 1910 are possible having more or less components than the computer system depicted in FIG. 19. This computer system 1910 may perform any of the methods and/or functions described above with reference to FIGS. 1-18.

The examples described above should not be taken as limiting or preferred. These examples sufficiently illustrate the technology disclosed without being overly complicated, and are not intended to illustrate all embodiments of the technology disclosed. A person having ordinary skill in the art will appreciate that there are many potential applications for one or more implementations of this disclosure.

One of ordinary skill in the art can appreciate that a computer or other client device can be deployed as part of a computer network. In this regard, the technology disclosed pertains to any computer system having any number of memory or storage units, and any number of applications and processes occurring across any number of storage units or volumes. The technology disclosed can apply to an environment with server computers and client computers deployed in a network environment, having remote or local storage. The technology disclosed can also apply to a standalone computing device, having programming language functionality, interpretation and execution capabilities.

The technology disclosed can be implemented in the context of any computer-implemented system including a database system, a multi-tenant environment, or the like. Moreover, this technology can be implemented using two or more separate and distinct computer-implemented systems that cooperate and communicate with one another. The disclosed technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Applicant hereby discloses in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicant indicates that aspects of the present invention may consist of any such feature or combination of features. In view of the foregoing description it will be evident to a person skilled in the art that various modifications may be made within the scope of the invention.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Also as used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

The invention claimed is:

1. A method of training a neural network to create an embedding space including a catalog of documents, the method comprising:

providing a plurality of training sets of K+2 training documents to a computer system, K being an integer greater than 1, each training document being represented by a corresponding training vector x, each set of training documents including a target document represented by a vector $x^t$, a favored document represented by a vector $x^s$, and K unfavored documents represented respectively by vectors $x_i^u$, where i is an integer from 1 to K, and each of the vectors including a plurality of input vector elements;

for each given one of the training sets, passing, by the computer system, the vector representing each document of the training set through a neural network to derive a corresponding output vector $y^t$ a corresponding output vector $y^s$, and corresponding output vectors $y_i^u$, each of the output vectors including a plurality of output vector elements, the neural network including a set of adjustable parameters which dictate an amount of influence that is imposed on each input vector element of an input vector to derive each output vector element of the output vector;

adjusting the parameters of the neural network so as to reduce a loss L, which is an average over all of the output vectors $y_i^u$ of $[D(y^t,y^s)-D(y^t,y_i^u)]$, where D is a distance wherein the vectors, wherein the loss L is $\log(1+\Sigma_{i=1}^{K} e^{D(y^t,y^s)-D(y^t,y_i^u)})$; and for each given one of the training sets, passing the vector representing each document of the training set through the neural network having the adjusted parameters to derive the output vectors.

2. The method of claim 1, wherein the parameters of the neural network include weights and the weights of the neural network are adjusted by back propagation as a function of the loss L.

3. The method of claim 1,
wherein for each given one of the training sets, K+2 identical neural networks are implemented, such that each document of a respective training set passes through a corresponding neural network of the K+2 identical neural networks.

4. The method of claim 3, wherein the parameters of the neural networks include weights and the weights of each respective neural network, of the K+2 neural networks, are adjusted by back propagation as a function of the loss L and in dependence on the output vector output from the respective neural network.

5. The method of claim 1,
wherein for each given one of the training sets, K+2 neural networks are implemented, such that each document of a respective training set passes through a corresponding neural network of the K+2 identical neural networks.

6. The method of claim 5, wherein the parameters of the neural networks include weights and the weights of each respective neural network, of the K+2 neural networks, are adjusted by back propagation as a function of the loss L and in dependence on the output vector output from the respective neural network.

7. The method of claim 1, further comprising:
repeatedly passing each given one of the training sets through the neural network to adjust the parameters until a value of the loss L is satisfactory and identify the neural network as a production model;

obtaining raw data representing documents from a particular data domain for which the production model has been trained, the documents represented by the raw data being unlabeled with no information regarding a measure of dissimilarity between any the documents; and passing the raw data through the production model to create a production embedding of documents.

8. The method of claim 1, wherein each training set of K+2 documents is obtained by:
providing, to a user, the K+2 training documents including the target document; receiving, from the user, a selection of the favored document determined to most closely match the target document; and identifying the unfavored documents of the K+2 training documents as the unfavored documents.

9. The method of claim 1, wherein each training set of K+2 documents is obtained by:
providing, to a model replicating user behavior, the K+2 training documents including the target document;

receiving, from the model, a selection of the favored document determined to most closely match the target document; and identifying the unfavored documents of the K+2 training documents as the unfavored documents.

10. A method of training a neural network to create an embedding space including a catalog of documents, the method comprising:

obtaining a set of K+2 training documents, K being an integer greater than 1, the set of K+2 documents including a target document represented by a vector $x^t$, a favored document represented by a vector $x^s$ and unfavored documents represented by vectors $x_i^u$, where i is an integer from 1 to K;

passing each of the vector representations of the set of K+2 training documents through a neural network to derive corresponding output vectors, including vector $y^t$ derived from the vector $x^t$, vector $y^s$ derived from the vector $x^s$ and vectors $y_i^u$ respectively derived from vectors $x_i^u$; and repeatedly adjusting parameters of the neural network through back propagation until a sum of differences calculated from (i) a distance between the vector $y^t$ and the vector $y^s$ and (ii) distances between the vector $y^t$ and each of the vectors $y_i^u$ satisfies a predetermined criteria, wherein the sum of differences corresponds to a likelihood that the favored document will be selected over the unfavored documents and further wherein the calculated sum of differences is a loss L function calculated as $\log(1+\Sigma_{i=1}^{K} e^{D(y^t,y^s)-D(y^t,y_i^u)})$ and wherein the parameters of the neural network include weights and the weights of the neural network are adjusted by back propagation as a function of the loss L.

11. The method of claim 10, wherein the obtaining of the set of training documents includes:
providing, to a user, the K+2 training documents including the target document;

receiving, from the user, a selection of the favored document determined to most closely match the target document; and identifying the unfavored documents of the K+2 training documents as the unfavored documents.

12. The method of claim 10, wherein the obtaining of the set of training documents includes:
- providing, to a model replicating user behavior, the K+2 training documents including the target document;
- receiving, from the model, a selection of the favored document determined to most closely match the target document; and
- identifying the unfavored documents of the K+2 training documents as the unfavored documents.

13. A non-transitory computer readable storage medium impressed with computer program instructions to train a neural network to create an embedding space including a catalog of documents, the instructions, when executed on a processor, implement a method comprising:
- providing a plurality of training sets of K+2 training documents to a computer system, K being an integer greater than 1, each training document being represented by a corresponding training vector x, each set of training documents including a target document represented by a vector $x^t$, a favored document represented by a vector $x^s$, and K>1 unfavored documents represented respectively by vectors $x_i^u$, where i is an integer from 1 to K, and each of the vectors including a plurality of input vector elements;
- for each given one of the training sets, passing, by the computer system, the vector representing each document of the training set through a neural network to derive a corresponding output vector $y^t$ a corresponding output vector $y^s$, and corresponding output vectors $y_i^u$, each of the output vectors including a plurality of output vector elements, the neural network including a set of adjustable parameters which dictate an amount of influence that is imposed on each input vector element of an input vector to derive each output vector element of the output vector;
- adjusting the parameters of the neural network so as to reduce a loss L, which is an average over all of the output vectors $y_i^u$ of $[D(y^t,y^s)-D(y^t, y_i^u)]$, where D is a distance between two vectors, wherein the loss L is $\log(1+\Sigma_{i=1}^K e^{D(y^t,y^s)-D(y^t,y_i^u)})$; and
- for each given one of the training sets, passing the vector representing each document of the training set through the neural network having the adjusted parameters to derive the output vectors.

14. A non-transitory computer readable storage medium impressed with computer program instructions to train a neural network to create an embedding space including a catalog of documents, the instructions, when executed on a processor, implement a method comprising:
- obtaining a set of K+2 training documents, K being an integer greater than 1, the set of K+2 documents including a target document represented by a vector $x^t$, a favored document represented by a vector $x^x$ and unfavored documents represented by vectors $x_i^u$, where i is an integer from 1 to K;
- passing each of the vector representations of the set of K+2 training documents through a neural network to derive corresponding output vectors, including vector $y^t$ derived from the vector $x^t$, vector $y^s$ derived from the vector $x^s$ and vectors $y_i^u$ respectively derived from vectors $x_i^u$; and
- repeatedly adjusting parameters of the neural network through back propagation until a sum of differences calculated from (i) a distance between the vector $y^t$ and the vector $y^s$ and (ii) distances between the vector $y^t$ and each of the vectors $y_i^u$ satisfies a predetermined criteria, wherein the sum of differences corresponds to a likelihood that the favored document will be selected over the unfavored documents and further wherein the calculated sum of differences is a loss L function calculated as $\log(1+\Sigma_{i=1}^K e^{D(y^t,y^s)-D(y^t,y_i^u)})$ and wherein the parameters of the neural network include weights and the weights of the neural network are adjusted by back propagation as a function of the loss L.

15. A system including one or more processors coupled to memory, the memory loaded with computer instructions to train a neural network to create an embedding space including a catalog of documents, the instructions, when executed on the processors, implement actions comprising:
- providing a plurality of training sets of K+2 training documents to a computer system, K being an integer greater than 1, each training document being represented by a corresponding training vector x, each set of training documents including a target document represented by a vector $x^t$, a favored document represented by a vector $x^s$, and K>1 unfavored documents represented respectively by vectors $y_i^u$, where i is an integer from 1 to K, and each of the vectors including a plurality of input vector elements;
- for each given one of the training sets, passing, by the computer system, the vector representing each document of the training set through a neural network to derive a corresponding output vector $y^t$ a corresponding output vector $y^s$, and corresponding output vectors $y_i^u$, each of the output vectors including a plurality of output vector elements, the neural network including a set of adjustable parameters which dictate an amount of influence that is imposed on each input vector element of an input vector to derive each output vector element of the output vector;
- adjusting the parameters of the neural network so as to reduce a loss L, which is an average over all of the output vectors $y_i^u$ of $[D(y^t,y^s)-D(y^t, y_i^u)]$, where D is a distance between two vectors, wherein the loss L is $\log(1+\Sigma_{i=1}^K e^{D(y^t,y^s)-D(y^t,y_i^u)})$; and
- for each given one of the training sets, passing the vector representing each document of the training set through the neural network having the adjusted parameters to derive the output vectors.

16. A system including one or more processors coupled to memory, the memory loaded with computer instructions to train a neural network to create an embedding space including a catalog of documents, the instructions, when executed on the processors, implement actions comprising:
- obtaining a set of K+2 training documents, K being an integer greater than 1, the set of K+2 documents including a target document represented by a vector $x^t$, a favored document represented by a vector $x^s$ and unfavored documents represented by vectors $x_i^u$, where i is an integer from 1 to K;
- passing each of the vector representations of the set of K+2 training documents through a neural network to derive corresponding output vectors, including vector $y^t$ derived from the vector $x^t$, vector $y^s$ derived from the vector $x^s$ and vectors $y_i^u$ respectively derived from vectors $x_i^u$; and
- repeatedly adjusting parameters of the neural network through back propagation until a sum of differences calculated from (i) a distance between the vector $y^t$ and the vector $y^s$ and (ii) distances between the vector $y^t$ and each of the vectors $y_i^u$ satisfies a predetermined criteria, wherein the sum of differences corresponds to a likelihood that the favored document will be selected over the unfavored documents and further wherein the calculated sum of differences is a loss L function calculated as $\log(1+\Sigma_{i=1}^{K} e^{D(y^f, y^s) - D(y^f, y_i^u)})$ and wherein the parameters of the neural network include weights and the weights of the neural network are adjusted by back propagation as a function of the loss L.

* * * * *